United States Patent
Okamura

(10) Patent No.: US 12,066,042 B2
(45) Date of Patent: Aug. 20, 2024

(54) HYDRAULIC SYSTEM

(71) Applicant: Hitachi Construction Machinery Co., Ltd., Tokyo (JP)

(72) Inventor: Jun Okamura, Kasumigaura (JP)

(73) Assignee: Hitachi Construction Machinery Co., Ltd., Tokyo (JP)

(*) Notice: Subject to any disclaimer, the term of this patent is extended or adjusted under 35 U.S.C. 154(b) by 0 days.

(21) Appl. No.: 18/026,208

(22) PCT Filed: Feb. 18, 2022

(86) PCT No.: PCT/JP2022/006784
§ 371 (c)(1),
(2) Date: Mar. 14, 2023

(87) PCT Pub. No.: WO2022/196252
PCT Pub. Date: Sep. 22, 2022

(65) Prior Publication Data
US 2023/0332631 A1    Oct. 19, 2023

(30) Foreign Application Priority Data
Mar. 19, 2021    (JP) .................... 2021-046444

(51) Int. Cl.
*F15B 21/08*    (2006.01)
*F15B 11/08*    (2006.01)

(52) U.S. Cl.
CPC ............ *F15B 21/087* (2013.01); *F15B 11/08* (2013.01); *F15B 2211/3144* (2013.01);
(Continued)

(58) Field of Classification Search
CPC ....... F15B 11/0406; F15B 11/08; F15B 11/10; F15B 21/087; F15B 2211/355
See application file for complete search history.

(56) References Cited

U.S. PATENT DOCUMENTS 6,892,012 B2 *  5/2005  Nakatate ............... G02B 6/403
                                                    385/115
10,593,458 B2 *  3/2020  Mueller ............. B60T 8/17616
(Continued)

FOREIGN PATENT DOCUMENTS

EP    1 167 777 A1    1/2002
JP    4-143334 A    5/1992
(Continued)

OTHER PUBLICATIONS

International Search Report (PCT/ISA/210) issued in PCT Application No. PCT/JP2022/006784 dated Apr. 26, 2022 with English translation (four (4) pages).
(Continued)

*Primary Examiner* — Michael Leslie
(74) *Attorney, Agent, or Firm* — Crowell & Moring LLP

(57) ABSTRACT

An object of the invention of the present application is to provide a hydraulic system that is capable of causing a control pressure outputted from a solenoid valve to follow a control request value quickly at the time the solenoid valve starts to be driven. To achieve the object, in the hydraulic system including a solenoid valve that generates a control pressure for operating a control valve, an operation device that is operated to input a control request value as a request value for the control pressure, and a controller configured to set a control target value as a target value for the control pressure depending on the control request value and drive the solenoid valve with the control target value, the controller sets the control target value such that the control target value becomes a maximum output pressure in a usage range of the solenoid valve at the time of starting to drive the solenoid valve and becomes gradually closer to the control request value as time elapses after having reached the maximum output pressure.

4 Claims, 8 Drawing Sheets

(52) U.S. Cl.
 CPC ... *F15B 2211/327* (2013.01); *F15B 2211/329* (2013.01); *F15B 2211/355* (2013.01)

(56) References Cited

U.S. PATENT DOCUMENTS

| | | | |
|---|---|---|---|
| 11,111,931 B2* | 9/2021 | Muraoka | F15B 11/0406 |
| 11,118,327 B2* | 9/2021 | Kobayashi | F15B 11/028 |
| 11,149,757 B2* | 10/2021 | Yumoto | E02F 9/2296 |
| 2018/0254134 A1 | 9/2018 | Mueller et al. | |
| 2022/0186459 A1 | 6/2022 | Igarashi et al. | |

FOREIGN PATENT DOCUMENTS

| | | |
|---|---|---|
| JP | 6646740 B2 | 2/2020 |
| JP | 2021-4540 A | 1/2021 |
| WO | WO 01/48386 A1 | 7/2001 |

OTHER PUBLICATIONS

Japanese-language Written Opinion (PCT/ISA/237) issued in PCT Application No. PCT/JP2022/006784 dated Apr. 26, 2022 (four (4) pages).
International Preliminary Report on Patentability (PCT/IB/338 & PCT/IB/373) issued in PCT Application No. PCT/JP2022/006784 dated Sep. 28, 2023, including English translation of document C2 (Japanese-language Written Opinion (PCT/ISA/237), filed on Mar. 14, 2023) (6 pages).

* cited by examiner

HYDRAULIC SYSTEM

TECHNICAL FIELD

The present invention relates to a controller for a solenoid valve used in a hydraulic circuit on a construction machine or the like, and more particularly to a controller that employs a drive method of flowing an overexcitation current through a solenoid of a solenoid valve at the time of starting to drive the solenoid valve and thereafter flowing a current therethrough for enabling the solenoid valve to keep a predetermined action.

BACKGROUND ART

In recent years, there have been growing demands for automatically driven construction machines such as hydraulic excavators, and efforts have been in progress to perform electronic control on construction machines. One way of performing electronic control on construction machines is to use a solenoid valve. For example, there has been known a method of operating a control valve for controlling a main actuator on construction machines, such as a hydraulic cylinder or a hydraulic motor, with hydraulic pressures controlled by a solenoid valve.

For making construction machines electronically controlled, emphasis is placed on the accuracy with which they perform work. It is necessary for solenoid valves used in the electronically controlling method described above to cause hydraulic pressures to follow required control pressures quickly in order to drive the construction machines with a predetermined level of accuracy. In particular, waste time in a hydraulic pressure response at the time a solenoid valve starts to be driven causes a delay in operating a control valve of a construction machine, with the result that the construction machine tends in operation to deviate from a target action when it starts to operate, leading to a reduction in the accuracy of the work to be performed. Consequently, it is an important task for electronically controlling the construction machine to reduce waste time in a hydraulic pressure buildup at the time of the solenoid valve starts to be driven.

According to one known process of reducing waste time at the time of starting to drive a solenoid valve, the solenoid valve is opened at a high speed by flowing an overexcitation current through the solenoid thereof at the time of starting to drive the solenoid valve, and after the solenoid valve has been open, a holding current is flowed through the solenoid for the solenoid valve to hold a predetermined hydraulic pressure.

According to Patent Document 1, for example, it has been proposed to store in advance overexcitation current values to flow through the solenoid and holding current values as well as periods of time for which the overexcitation current is supplied, in a solenoid valve drive control device as a function of temperature information measured by a temperature sensor installed in a solenoid valve unit.

Since the viscosity of a hydraulic working fluid such as a hydraulic working oil for use in a solenoid valve is temperature-dependent, the response of the solenoid valve at the time it is driven is also dependent on the temperature of the hydraulic working fluid. Specifically, at low temperatures, the viscosity of the hydraulic working fluid is higher, tending to restrict movement of its spool due to the viscous resistance at the time of starting to drive the solenoid valve and hence inviting an increase in waste time.

According to Patent Document 1, the function stored in the solenoid valve drive control device represents larger overexcitation current values and longer periods of time for which the overexcitation current is supplied at lower temperatures than at higher temperatures. By controlling a current to be supplied to the solenoid on the basis of the stored function, the solenoid is able to produce forces strong enough to overcome the viscosity of the hydraulic working fluid at lower temperatures, and hence the solenoid valve can reduce waste time in the hydraulic pressure response at any temperatures.

PRIOR ART DOCUMENT

Patent Document

Patent Document 1: JP6646740B2

SUMMARY OF THE INVENTION

Problem to be Solved by the Invention

Among many solenoid valves for use on construction machines is a solenoid proportional pressure control valve. The solenoid proportional pressure control valve is a solenoid valve having a function to control the output pressure thereof in proportion to a current supplied to the solenoid, and controls the output pressure by supplying a current according to a control request pressure. At the time the solenoid proportional pressure control valve starts to be driven, it is not always driven for the same control request pressure, and the control request pressure at the time the solenoid proportional pressure control valve starts to be driven is variable at different gradients depending on required action speeds from time to time of the construction machine that incorporates the solenoid proportional pressure control valve. In other words, a control request current to be supplied at the time the solenoid proportional pressure control valve starts to be driven is also variable at different gradients from time to time.

If it is assumed that the current control method disclosed in Patent Document 1 is applied to the solenoid proportional pressure control valve described above, then a control target current value for the solenoid of the solenoid valve is set to an overexcitation current value for a predetermined period of time based on the temperature, at the time the solenoid valve starts to be driven, and thereafter lowered to a control request current value according to a control request pressure, with the result that the current to be supplied will be controlled according to the control target current value. However, if the period of time during which the overexcitation current is to be supplied is determined irrespectively of the gradient at which a control request pressure value (control request current value) varies, then when the solenoid proportional pressure control valve starts to be driven, although the current control method exhibits a waste time reducing effect with respect to the gradient at which a certain control request pressure value (control request current value) varies over time, the current control method fails to exhibit a waste time reducing effect with respect to the gradient at which a different control request pressure value (control request current value) varies over time because the overexcitation time tends to become excessive, displacing the spool of the solenoid proportional pressure control valve excessively to cause the output pressure to become much higher than the control request pressure value, or because the overexcitation time tends to become too small, not displacing the spool sufficiently.

The present invention has been made in view of the above problems. It is an object of the present invention to provide a hydraulic system that is capable of causing a control pressure outputted from a solenoid valve to follow a control request value quickly at the time the solenoid valve starts to be driven.

Means for Solving the Problem

In order to achieve the above object, there is provided in accordance with the present invention a hydraulic system including a hydraulic pump, a hydraulic actuator that is driven by a hydraulic fluid delivered from the hydraulic pump, a control valve that performs control to cause the hydraulic fluid delivered from the hydraulic pump to be supplied to and discharged from the hydraulic actuator, a solenoid valve that generates a control pressure for operating the control valve, an operation device that is operated to input a control request value as a request value for the control pressure, and a controller configured to set a control target value as a target value for the control pressure depending on the control request value and drive the solenoid valve with the control target value. The controller is configured to set the control target value such that the control target value becomes a maximum output pressure in a usage range of the solenoid valve at the time of starting to drive the solenoid valve and becomes gradually closer to the control request value as time elapses after having reached the maximum output pressure.

According to the present invention arranged as described above, since the control target value at the time of starting to drive the solenoid valve is set to the maximum output pressure in the usage range of the solenoid valve irrespectively of the control request value, a time lag from the time of starting to drive the solenoid valve until the control pressure starts to rise can be shortened. Furthermore, inasmuch as the control target value becomes gradually closer to the control request value as time elapses from the time of starting to drive the solenoid valve, the control pressure becomes gradually closer to the control request value after the control pressure has risen. In this manner, at the time of starting to drive the solenoid valve, it is possible to cause the control pressure outputted from the solenoid valve to follow the control request value quickly.

Advantage of the Invention

According to the present invention, at the time of starting to drive the solenoid valve, it is possible to cause the control pressure outputted from the solenoid valve to follow the control request value quickly.

MODES FOR CARRYING OUT THE INVENTION

Figure 1:
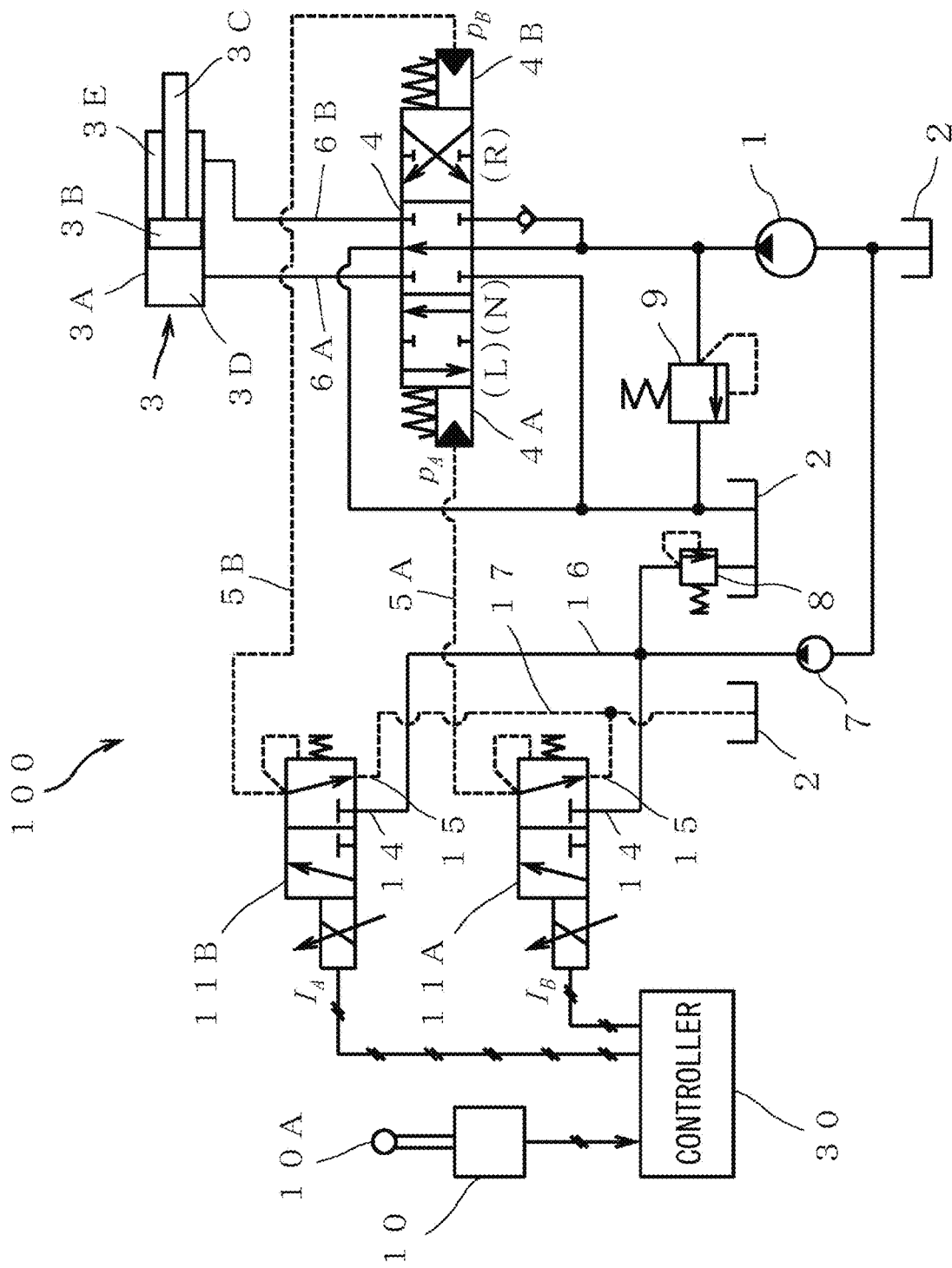
FIG. 1 is a circuit diagram of a solenoid valve controller according to a first embodiment of the present invention.

Hydraulic systems according to embodiments of the present invention, each incorporated in a hydraulic excavator, will be described in detail hereinbelow with reference to the drawings. Identical or corresponding parts are denoted by identical reference characters throughout views, and their redundant description will be omitted below.

First Embodiment

FIG. 1 is a circuit diagram of a hydraulic system 100 according to a first embodiment of the present invention. As illustrated in FIG. 1, a hydraulic pump 1 and a tank 2 jointly provide a main hydraulic fluid source. The hydraulic pump 1 is rotationally driven by a prime mover (not shown) on a large-size hydraulic excavator, for example, to draw in a hydraulic working oil from the tank 2 and deliver it as a high-pressure hydraulic fluid.

A hydraulic cylinder 3 for performing work is illustrated as a representative example of hydraulic actuator. The hydraulic cylinder 3 serves as a boom cylinder, an arm cylinder, a bucket cylinder (all not shown), or the like provided in a work implement of a hydraulic excavator, for example. The hydraulic cylinder 3 includes a tube 3A, a piston 3B, a rod 3C, etc.

The inner space of the tube 3A of the hydraulic cylinder 3 is divided into two hydraulic chambers 3D and 3E by the piston 3B. The rod 3C has a proximal end fixed to the piston 3B and a distal end portion protruding out of the tube 3A. The distal end portion of the rod 3C is selectively extended and contracted by a hydraulic fluid supplied from the hydraulic pump 1 to and discharged from the hydraulic chambers 3D and 3E in the tube 3A. The hydraulic actuator is not limited to the hydraulic cylinder 3 and may be a hydraulic motor for swinging or travelling of the hydraulic excavator, for example.

A directional control valve 4 functions as a control valve for controlling the hydraulic cylinder 3 and is connected between the hydraulic pump 1 combined with the tank 2 and the hydraulic cylinder 3. The directional control valve 4 is constituted by a 6-port 3-position hydraulic pilot directional control valve, for example, and includes hydraulic pilot sections 4A and 4B on respective left and right sides thereof. The hydraulic pilot sections 4A and 4B of the directional control valve 4 are connected to respective solenoid proportional pressure reducing valves 11A and 11B, to be described later, through respective control pressure lines 5A and 5B.

When the solenoid proportional pressure reducing valves 11A and 11B supply control pressures pA and pB to the hydraulic pilot sections 4A and 4B, the directional control valve 4 is shifted from a neutral position (N) to either a shifted position (L) or a shifted position (R). The hydraulic fluid from the hydraulic pump 1 is then supplied to and discharged from the hydraulic chambers 3D and 3E of the hydraulic cylinder 3 through paired main lines 6A and 6B, extending (driving) the rod 3C of the hydraulic cylinder 3 from or contracting (driving) the rod 3C into the tube 3A. At this time, the rate of flow of the hydraulic fluid supplied to and discharged from the hydraulic chambers 3D and 3E of the hydraulic cylinder 3 is variably controlled depending on the distance that the directional control valve 4 has been displaced (i.e., an operation signal based on a tilted amount of an operation lever 10A to be described later or design information, which is stored in advance in a controller 30 to be described later, of a surface to be worked by the hydraulic excavator).

A pilot pump 7 cooperates with the tank 2 in making up a pilot hydraulic fluid source. The pilot pump 7 is rotationally driven together with the hydraulic pump 1 of the main hydraulic fluid source by the prime mover. The pilot pump 7 has a delivery side connected to the tank 2 with a low-pressure relief valve 8 connected therebetween. The low-pressure relief valve 8 keeps the delivery pressure of the pilot pump 7 equal to or lower than a preset relief pressure. The delivery pressure of the pilot pump 7, i.e., a pilot pressure produced by the pilot pump 7, is supplied through a primary pressure line 16, to be described later, to a pump port 14a of the solenoid proportional pressure reducing valve 11A and a pump port 14b of the solenoid proportional pressure reducing valve 11B.

The hydraulic pump 1 of the main hydraulic fluid source has a delivery line 1A with a high-pressure relief valve 9 connected between the delivery line 1A and the tank 2. The high-pressure relief valve 9 keeps the delivery pressure of the hydraulic pump 1 equal to or lower than a preset relief pressure in order to prevent an excessive pressure from being developed in the hydraulic pump 1. The preset relief pressure is sufficiently higher than the preset relief pressure of the low-pressure relief valve 8.

An operation lever device 10 is an electric operation device and is constructed as an electric lever device for remotely controlling movement of the hydraulic cylinder 3. The operation lever device 10 includes the operation lever 10A that is manually tiltable by an operator of the hydraulic excavator. The operation lever device 10 outputs operation signals representative of the direction in which the operation lever 10A is operated and the amount by which the operation lever 10A is operated, through the controller 30 to each of the solenoid proportional pressure reducing valves 11A and 11B.

The operation lever device 10 is disposed in a cabin (not shown) as an operation room of the hydraulic excavator. On the other hand, the solenoid proportional pressure reducing valves 11A and 11B are disposed at a position significantly spaced from the cabin (e.g., at a position close to the directional control valve 4). That is, since the operation lever device 10 is an electric operation device, it is only required to be connected to the solenoid proportional pressure reducing valves 11A and 11B by electric wires (signal wires), and the distance therebetween may be extended to several meters or more if necessary. Incidentally, if a pilot hydraulic pressure pipe is used (i.e., if a pressure-reducing-valve type pilot control valve, rather than the electric lever device, is used), it is general practice to limit the length of the pilot hydraulic pressure pipe to one meter or less.

The solenoid proportional pressure reducing valves 11A and 11B supply the control pressure lines 5A and 5B with control pressures proportional to currents that are controlled by the controller 30 according to the operation signals from the operation lever device 10 or the design information, which is stored in advance in the controller 30, of the surface to be worked. When the control pressures are supplied to the respective hydraulic pilot sections 4A and 4B, the directional control valve 4 is shifted from the neutral position (N) to either the shifted position (L) or the shifted position (R). Consequently, the hydraulic fluid from the hydraulic pump 1 is supplied to and discharged from the hydraulic chambers 3D and 3E of the hydraulic cylinder 3 through the paired main lines 6A and 6B, extending or contracting (driving) the rod 3C of the hydraulic cylinder 3. In this manner, the extending and contracting movement of the hydraulic cylinder 3 is remotely controlled by the solenoid proportional pressure reducing valves 11A and 11B and the directional control valve 4 according to the operation signals from the operation lever device 10 or the design information, which is stored in advance in the controller 30, of the surface to be worked.

The primary pressure line 16 has a proximal end connected to the delivery side of the pilot pump 7 and a distal end connected to the pump ports 14 of the solenoid proportional pressure reducing valves 11A and 11B. Accordingly, the pump ports 14 are supplied with the pilot pressure delivered from the pilot pump 7 as primary pressures for the solenoid proportional pressure reducing valves 11A and 11B. A drain line 17 connects respective drain ports 15 of the solenoid proportional pressure reducing valves 11A and 11B to the tank 2 at all times.

The controller 30 modulates voltages applied to the solenoid proportional pressure reducing valves 11A and 11B by way of pulse width modulation, thereby controlling current values supplied to the solenoid proportional pressure reducing valves 11A and 11B. Details of such operation of the controller 30 will be described later.

Specific structural details of the solenoid proportional pressure reducing valves 11A and 11B will be described below with reference to FIG. 2. Inasmuch as the solenoid proportional pressure reducing valves 11A and 11B are essentially identical in structure to each other, the solenoid proportional pressure reducing valve 11A will be described below by way of example, and the solenoid proportional pressure reducing valve 11B will be omitted from description.

The solenoid proportional pressure reducing valve 11A includes a solenoid actuator 20 that is constituted by a proportional solenoid, for example, and a solenoid-operated pressure control valve 21 that is shiftable by the solenoid actuator 20 through a push rod 20C. The solenoid actuator 20 includes an actuator case 20A as an outer casing, a connector 20B that is integral with the actuator case 20A and electrically connected to the controller 30 (see FIG. 1) by a signal line or the like, the push rod 20C that is displaceably disposed in the actuator case 20A, and a solenoid (not shown) that is disposed in the actuator case 20A for driving the push rod 20C in an axial direction (a direction indicated by an arrow A or a direction indicated by an arrow B in FIG. 2).

Figure 2:
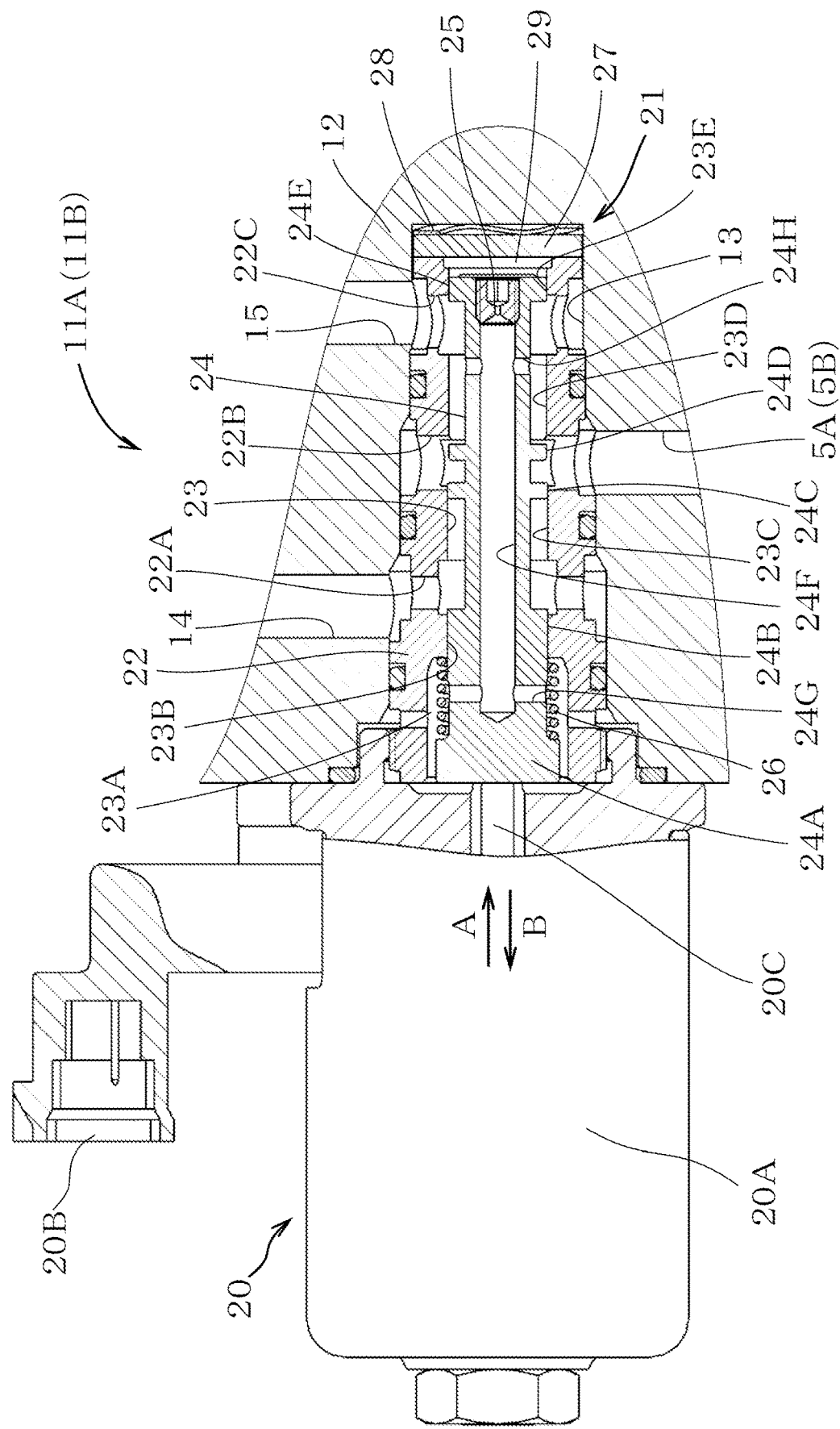
FIG. 2 is a partially cross-sectional view of a solenoid proportional pressure reducing valve according to the first embodiment of the present invention.

As illustrated in FIG. 2, when a control current is inputted from the controller 30 via the connector 20B to the solenoid actuator 20, the push rod 20C is driven in proportion to the current value to extend from the actuator case 20A in the direction indicated by the arrow A in FIG. 2. The push rod 20C is arranged to be displaced in a direction opposite the direction indicated by the arrow A (e.g., the direction indicated by the arrow B) when subjected to a load (a force in the direction indicated by the arrow B) larger than an electromagnetic force of the solenoid from a pilot spool 24 to be described later.

Specifically, the push rod 20C of the solenoid actuator 20 is normally biased to move toward the pilot spool 24 (in the direction indicated by the arrow A) by a force smaller than a force of a return spring 26 to be described later from a solenoid spring (not shown) disposed in the actuator case 20A. Therefore, when the solenoid spring is resiliently deformed flexurally, it allows the push rod 20C to be displaced in the direction indicated by the arrow B under the load. When the current value supplied from the controller 30 becomes zero, the push rod 20C of the solenoid actuator 20 returns to a maximally contracted position illustrated in FIG. 2.

The pressure control valve 21 of the solenoid proportional pressure reducing valve 11A includes a sleeve 22 that is inserted and fitted in a solenoid valve cartridge insertion hole 13 defined in a housing 12 as an outer casing and that is disposed coaxially with the push rod 20C of the solenoid actuator 20, and the pilot spool 24 fittingly inserted in a stepped hole 23 defined on an inner circumferential side of the sleeve 22.

The sleeve 22 of the pressure control valve 21 has an end on one axial side whose outer circumferential surface is threaded in an opening in an end on the other axial side of the actuator case 20A of the solenoid actuator 20. Therefore, the solenoid proportional pressure reducing valve 11A is of a cartridge structure in which the solenoid actuator 20, and the sleeve 22, the pilot spool 24, and the return spring 26 of the pressure control valve 21 are sub-assembled. Of the subassembly, the sleeve 22 is pushed together with the pilot spool 24 and the return spring 26 from the one axial side toward the other axial side into the solenoid valve cartridge insertion hole 13 in the housing 12. The sleeve 22 has an end face on the other axial side held against the bottom of the solenoid valve cartridge insertion hole 13 with a partition plate 27 and a spring member 28 interposed therebetween. Stated otherwise, the actuator case 20A of the solenoid actuator 20 is fixed to the housing 12 in such a manner as to close the solenoid valve cartridge insertion hole 13 in the housing 12 and a spring housing hole portion 23A in the sleeve 22 from the one axial side thereof.

The sleeve 22 has hydraulic fluid holes 22A, 22B, and 22C defined diametrically therein in communication with the stepped hole 23 and axially spaced from each other. The hydraulic fluid hole 22A that is positioned closer to the one axial side of the sleeve 22 is held in communication with the pump port 14 defined in the housing 12 at all times. The hydraulic fluid hole 22B that is positioned axially intermediate between the hydraulic fluid holes 22A and 22C is held in communication with the control pressure line 5A at all times. The hydraulic fluid hole 22C that is positioned closer to the other axial side of the sleeve 22 is held in communication with the drain port 15 at all times. The hydraulic fluid holes 22A, 22B, and 22C are sealed from each other by O-rings or the like on an outer circumferential side of the sleeve 22.

The stepped hole 23 defined on the inner circumferential side of the sleeve 22 includes the spring housing hole portion 23A positioned on the one axial side thereof (an open end side thereof) and a plurality of slide hole portions 23B through 23E smaller in diameter than the spring housing hole portion 23A. The spring housing hole portion 23A of the stepped hole 23 is defined as an increased-diameter hole having an inside diameter larger than that of the slide hole portion 23B that is positioned closest to the one axial side of the stepped hole 23 among the slide hole portions 23B through 23E thereof. The spring housing hole portion 23A has an end (an end on the one axial side) as an open end that is held in communication with (opens into) the opening on the other axial side of the actuator case 20A, on the one axial side of the housing 12.

The stepped hole 23 is defined as a spool slide hole on the inner circumferential side of the sleeve 22 and has the slide hole portions 23B, 23C, 23D, and 23E in which the pilot spool 24 is inserted and fitted. The slide hole portions 23B, 23C, 23D, and 23E are smaller stepwise in inside diameter from the one axial side to the other axial side of the sleeve 22. Of these slide hole portions 23B, 23C, 23D, and 23E, the slide hole portions 23B and 23C may be of the same diameter as long as they are larger in diameter than the slide hole portions 23D and 23E. The slide hole portions 23D and 23E may be of the same diameter as long as they are smaller in diameter than the slide hole portions 23B and 23C.

The pilot spool 24 is axially inserted and fitted in the stepped hole 23 in the sleeve 22. The pilot spool 24 in the stepped hole 23 has a boss 24A as a closed end on the one axial side thereof that is held in abutment at all times against the push rod 20C of the solenoid actuator 20. As the push rod 20C is extended from the actuator case 20A in the direction indicated by the arrow A in FIG. 2 or retracted into the actuator case 20A in the direction indicated by the arrow B in FIG. 2, the pilot spool 24 is axially moved (slidably displaced) in the stepped hole 23.

The pilot spool 24 has four lands 24B, 24C, 24D, and 24E on its outer circumferential surface that are axially spaced from each other. The land 24B that is positioned closer to the boss 24A (closest to the one axial side) is larger in diameter than the land 24E that is positioned on a distal end portion of the pilot spool 24 (closest to the other axial side). The lands 24C and 24D that are positioned intermediate between the land 24B on the one axial side and the land 24E on the other axial side are shaped as annular flanges. The outside diameter of the land 24C is larger than the outside diameter of the land 24D. The land 24B on the one axial side and the intermediate land 24C of the larger outside diameter may be of the same diameter. The intermediate land 24D of the smaller outside diameter and the land 24E on the other axial side may be of the same diameter.

With the pilot spool 24 being inserted and fitted in the sleeve 22 (the stepped hole 23), the land 24B on the one axial side is disposed for axial sliding displacement in the slide hole portion 23B, and the land 24E on the other axial side is disposed for axial sliding displacement in the slide hole portion 23E. Of the intermediate lands 24C and 24D, the larger-diameter intermediate land 24C is disposed for sliding displacement in the slide hole portion 23C, and the smaller-diameter intermediate land 24D is disposed in a position to hold the hydraulic fluid hole 22B in communication with the slide hole portion 23D. When the larger-diameter intermediate land 24C moves (advances) from the slide hole portion 23C to the position of the hydraulic fluid hole 22B, the slide hole portion 23C (the pump port 14) is brought into communication with the control pressure line 5A via the hydraulic fluid hole 22B. At this time, the smaller-diameter intermediate land 24D is slidably inserted and fitted in the slide hole portion 23D, interrupting communication between the hydraulic fluid hole 22B (the control pressure line 5A) and the drain port 15 (the slide hole portion 23D).

The larger-diameter intermediate land 24C thus acts as a land on the pilot spool 24 for interrupting and establishing communication between the pump port 14 and the control pressure line 5A. On the other hand, the smaller-diameter intermediate land 24D acts as a land on the pilot spool 24 for establishing and interrupting communication between the control pressure line 5A and the drain port 15.

Specifically, in the pilot spool 24, while the larger-diameter intermediate land 24C is being disposed (in slidable contact) in the slide hole portion 23C in the sleeve 22, the larger-diameter intermediate land 24C interrupts communication between the hydraulic fluid holes 22A and 22B (between the pump port 14 and the control pressure line 5A). When the pilot spool 24 moves toward the other axial side (in the direction indicated by the arrow A in FIG. 2) to advance the larger-diameter intermediate land 24C from the slide hole portion 23C to the position of the hydraulic fluid hole 22B, the larger-diameter intermediate land 24C establishes communication between the hydraulic fluid holes 22A and 22B (between the pump port 14 and the control pressure line 5A). Therefore, the hydraulic working oil supplied from the primary pressure line 16 (the pump port 14) illustrated in FIG. 1 flows through the space between the sleeve 22 and the pilot spool 24 and is introduced from the hydraulic fluid hole 22B through the control pressure line 5A into the hydraulic pilot section 4A of the directional control valve 4.

At this time, the smaller-diameter intermediate land 24D is inserted (in slidable contact) in the slide hole portion 23D in the sleeve 22, interrupting communication between the hydraulic fluid holes 22B and 22C (between the control pressure line 5A and the drain port 15). Consequently, no hydraulic working oil flows from the control pressure line 5A toward the drain port 15. However, when the pilot spool 24 returns toward the one axial side (in the direction indicated by the arrow B in FIG. 2) until the smaller-diameter intermediate land 24D moves from the slide hole portion 23D to the position of the hydraulic fluid hole 22B (i.e., reaches the position illustrated in FIG. 2), communication is established between the hydraulic fluid holes 22B and 22C (between the control pressure line 5A and the drain port 15). Therefore, the hydraulic working oil supplied to the hydraulic pilot section 4A of the directional control valve 4 flows through the control pressure line 5A into the hydraulic fluid hole 22B and the space between the sleeve 22 and the pilot spool 24 and returns from the drain port 15 to a drain line 43 (see FIG. 1).

The larger-diameter intermediate land 24C has an end face facing toward the one axial side and having the same pressure-bearing area as that of an end face, facing toward the other axial side, of the land 24B on the one axial side. Therefore, a hydraulic pressure acts in the direction indicated by the arrow B on the larger-diameter intermediate land 24C. On the other hand, the smaller-diameter intermediate land 24D has an end face facing toward the other axial side and having the same pressure-bearing area as that of an end face, facing toward the one axial side, of the land 24E on the other axial side. Therefore, a hydraulic pressure acts in the direction indicated by the arrow A on the smaller-diameter intermediate land 24C. Consequently, when the larger-diameter intermediate land 24C and the smaller-diameter intermediate land 24D bear the pressure in the control pressure line 5A via the hydraulic fluid hole 22B, they undergo a pressure-bearing area difference. In other words, a pressure-bearing area difference occurs between the intermediate lands 24C and 24D with respect to the control pressure in the sleeve 22. The pilot spool 24 bears a hydraulic pressure (pressing force) commensurate with the pressure-bearing area difference between the larger-diameter intermediate land 24C and the smaller-diameter intermediate land 24D as a load directed (in the direction indicated by the arrow B) against the push rod 20C.

The pilot spool 24 has a bottomed axial hole 24F defined therein that extends axially from an end face thereof on the other axial side toward the boss 24A. A tubular orifice 25 is disposed in an open end (an end near a damping chamber 29 to be described below) of the axial hole 24F. The axial hole 24F is held in communication with the damping chamber 29 through the orifice 25 at all times. The pilot spool 24 also has hydraulic lines 24G and 24H defined therein that extend radially outwardly from the axial hole 24F. The hydraulic lines 24G and 24H keep the axial hole 24F in communication with the spring housing hole portion 23A and the hydraulic fluid hole 22C in the sleeve 22 at all times.

The hydraulic working oil under a low pressure is introduced from the drain port 15 through the hydraulic line 24H, the axial hole 24F, and the hydraulic line 24G into the spring housing hole portion 23A in the sleeve 22. The hydraulic working oil is introduced from an outer circumferential surface of the boss 24A of the pilot spool 24 along a peripheral region of the push rod 20C into the actuator case 20A of the solenoid actuator 20, and has a function to lubricate the inside of the actuator case 20A and cool the solenoid, etc. therein.

The return spring 26 is a biasing member for normally biasing the pilot spool 24 to move toward the one axial side. The return spring 26 is disposed under compression between the spring housing hole portion 23A in the sleeve 22 (of the stepped hole 23) and the boss 24A of the pilot spool 24. As illustrated in FIG. 2, the pilot spool 24 is housed in the sleeve 22 (the spring housing hole portion 23A) while being pressed at all times toward the push rod 20C of the solenoid actuator 20 under the biasing force of the return spring 26. The push rod 20C of the solenoid actuator 20 is biased to move toward the pilot spool 24 under a smaller force than the biasing force of the return spring 26 by the spring, not shown, disposed in the actuator case 20A.

The partition plate 27 closes the end face on the other axial side of the sleeve 22 on the bottom side of the solenoid valve cartridge insertion hole 13. The spring member 28, which includes a wave washer or the like, for example, is disposed between the bottom of the solenoid valve cartridge insertion hole 13 and the partition plate 27. The spring member 28 holds the partition plate 27 pressed against the end face on the other axial side of the sleeve 22. The partition plate 27 defines the damping chamber 29 on the other axial side of the pilot spool 24.

The damping chamber 29 is a circular space disposed opposite the solenoid actuator 20 across the pilot spool 24 and surrounded by an inner wall surface (the slide hole portion 23E) of the sleeve 22 and the partition plate 27. The damping chamber 29 is held in communication at all times with the axial hole 24F in the pilot spool 24 through the orifice 25. Therefore, when the pilot spool 24 moves in the sleeve 22 toward the other axial side (in the direction indicated by the arrow A in FIG. 2), the hydraulic working oil in the damping chamber 29 is discharged through the orifice 25 into the axial hole 24F. The orifice 25 constricts the flow of the discharged hydraulic working oil to thereby make adjustments to prevent the pilot spool 24 from moving quickly but to make the speed lower at which the pilot spool 24 moves. In other words, the movement (moving speed) of the pilot spool 24 is adjusted depending on the restrictor diameter of the orifice 25.

Figure 3:
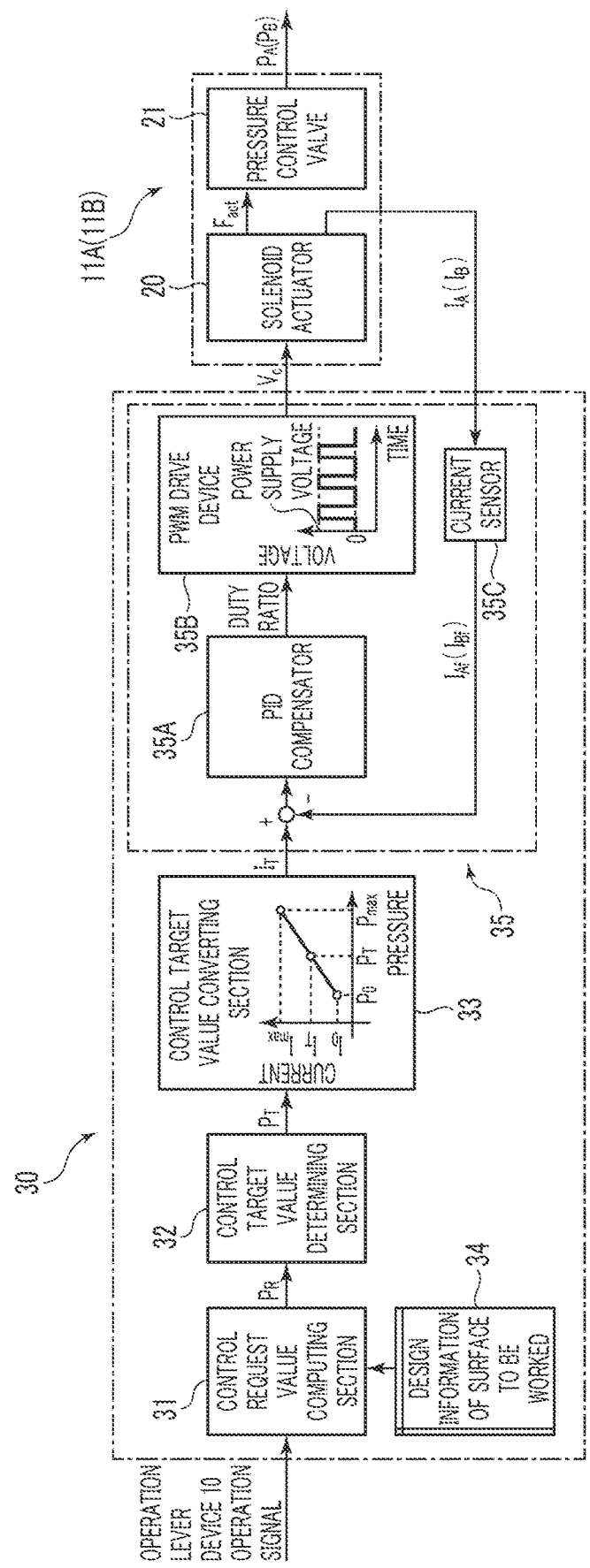
FIG. 3 is a functional block diagram of a hydraulic system according to the first embodiment of the present invention.

Specific configurational details of the controller 30 will be described below with reference to FIG. 3. An example in which a current supplied to the solenoid proportional pressure reducing valve 11A is controlled will be described below. A current supplied to the solenoid proportional pressure reducing valve 11B may also be controlled by performing the same process as controlling the solenoid proportional pressure reducing valve 11A in the controller 30.

The controller 30 represents a controller according to the first embodiment of the present invention, and includes a control request value computing section 31, a control target value determining section 32, a control target value converting section 33, a to-be-worked surface design information storage area 34, and a current feedback controlling section 35.

The control request value computing section 31 computes and outputs a control request value pR of a control pressure as a controlled variable for the solenoid proportional pressure reducing valve 11A on the basis of an operation signal from the operation lever device 10 or design information, which is stored in advance in the to-be-worked surface design information storage area 34 to be described later, of a surface to be worked.

Moreover, the control request value computing section 31 may be configured to select contents of computation of the control request value pR depending on how the hydraulic excavator is driven. For example, if the hydraulic excavator is manually driven by the operation lever device 10, then the control request value computing section 31 may output a control request value pR proportional to the amount by which the operation lever 10A is operated. If the hydraulic excavator is automatically driven, the control request value computing section 31 may calculate a trajectory of the work implement of the hydraulic excavator at the time the hydraulic excavator performs work, with respect to the design information of a surface to be worked (the width, height, slope, etc. of the surface), compute a control pressure for the directional control valve 4 for outputting an amount by which the boom cylinder, the arm cylinder, or the bucket cylinder is to be extended or contracted, and output the computed control pressure as a control request value pR.

The control target value determining section 32 corrects the control request value pR outputted from the control request value computing section 31 and outputs a control target valve pT for the control pressure of the solenoid proportional pressure reducing valve 11A. A detailed processing sequence performed by the control target value determining section 32 will be described later.

The control target value converting section 33 converts the control target valve pT inputted thereto into a control target current value IT for the solenoid proportional pressure reducing valve 11A and outputs the control target current value IT. A relation between currents inputted to the solenoid proportional pressure reducing valve 11A and control pressures to be outputted relative to the currents has been acquired in advance, and stored as a table of numerical values in the controller 30, for example. The control target value converting section 33 converts a control target valve pT into a control target current value IT by referring to the stored relation between currents and control pressures. According to the present embodiment, if a value in excess of a maximum output pressure pmax in a usage range of the solenoid proportional pressure reducing valve 11A is input as the control target valve pT to the control target value converting section 33, the control target value converting section 33 replaces the control target valve pT with pmax and outputs a maximum drive current value Imax corresponding to pmax. If the control target valve pT is less than a non-drive-equivalent value p0 for the solenoid proportional pressure reducing valve 11A, the control target value converting section 33 replaces the control target valve pT with p0 and outputs a non-drive-equivalent current value I0 corresponding to p0. The non-drive-equivalent current value I0 is set to such a current value that the electromagnetic force generated by the solenoid actuator 20 does not exceed the biasing force of the return spring 26.

The to-be-worked surface design information storage area 34 stores in advance the design information of a surface to be worked (the width, height, slope, etc. of the surface). When the control request value computing section 31 computes a control request value pR, it refers to the stored design information of the surface to be worked. The to-be-worked surface design information may be written into the to-be-worked surface design information storage area 34 via a control panel (not shown) in the cabin (not shown) as the operation room of the hydraulic excavator, for example, or may be acquired from an external server through wired or wireless communication established by a communication device (not shown) for external communication provided on the hydraulic excavator and written into the to-be-worked surface design information storage area 34.

In the current feedback controlling section 35, a current sensor 35C acquires a real current (actual current) IA that flows through the solenoid actuator 20 of the solenoid proportional pressure reducing valve 11A, and performs an A/D conversion process on the actual current IA to convert the actual current from an analog value IA to a digital value IAf. In the A/D conversion process, the digital value IAf converted from the analog value IA may be smoothed by being processed by a digital filter for noise removal and the like as needed, and the smoothed digital value may be used as the digital value IAf of the real current. The difference (IT−IAf) between the control target current value IT and the actual current IAf is calculated, and the calculated result is inputted to a PID compensator 35A.

The PID compensator 35A compensates for the difference (IT−IAf) between the control target current value IT and the actual current IAf to reduce the difference (IT−IAf), and outputs the result as a duty ratio.

A PWM drive device 35B performs pulse width modulation on a drive voltage VC to be applied to the solenoid actuator 20 according to the duty ratio outputted from the PID compensator 35A. An actual current IA depending on the drive voltage VC, an electric resistance, an inductor, and the like is then caused to flow to the solenoid actuator 20.

That is, the current feedback controlling section 35 performs a feedback control process using the actual current IA as a controlled variable, the control target current value IT as a target value, and the duty ratio for the pulse width modulation on the drive voltage VC as an operated amount.

Contents of a corrective calculation on the control request value pR in the control target value determining section 32 and a detailed processing sequence thereof will be described below.

Figure 4:
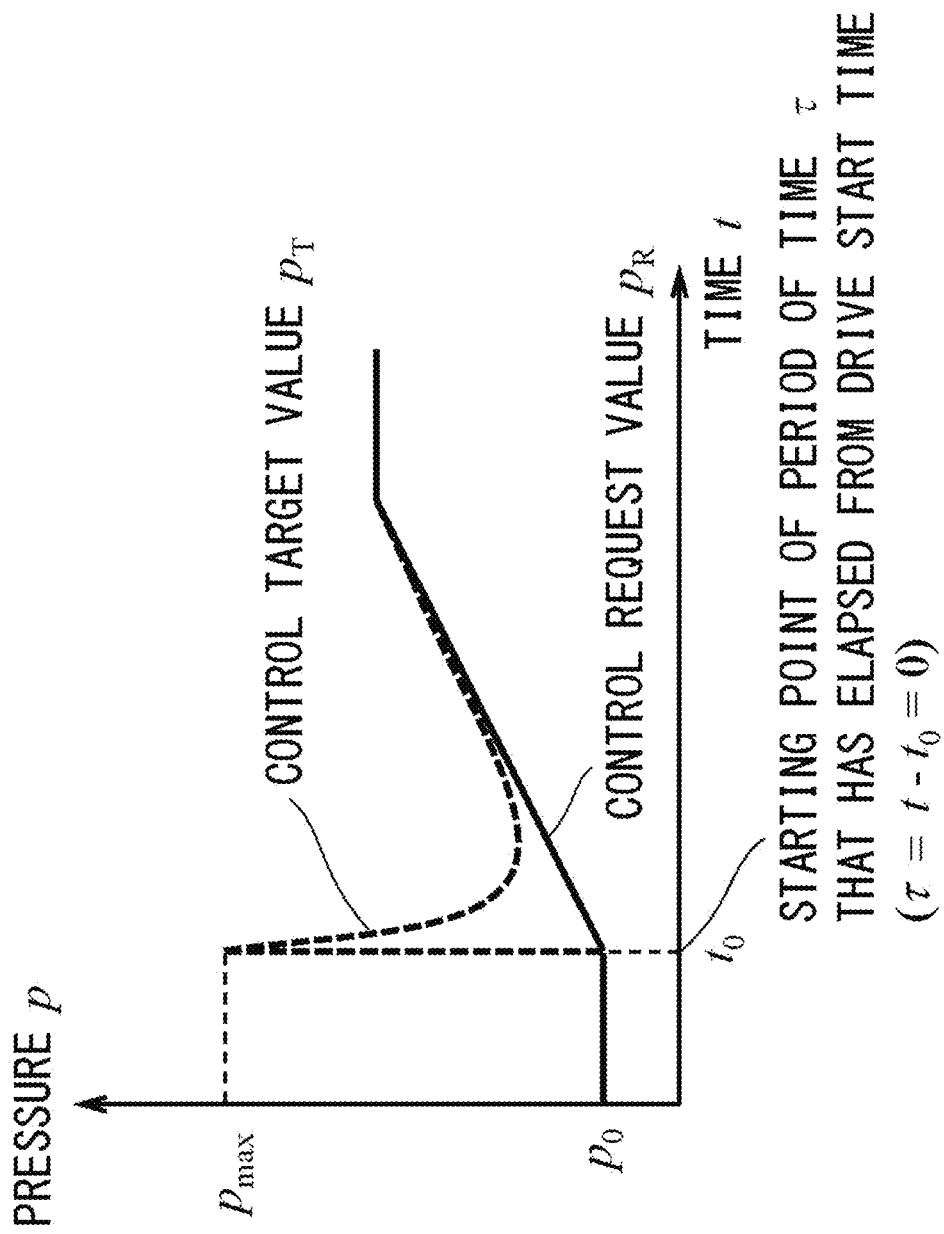
FIG. 4 illustrates time history waveforms of control request values and control target values according to the first embodiment of the present invention.

First, the contents of the corrective calculation in the control target value determining section 32 will be described below with reference to FIG. 4. FIG. 4 schematically illustrates time history waveforms of control request values pR (indicated by a solid line) and control target values pT (indicated by a broken line) outputted from the control target value determining section 32.

The control target value determining section 32 determines whether or not the control request value pR has switched from the non-drive-equivalent value p0 (e.g., pR=p0=0 MPa) for the solenoid proportional pressure reducing valve 11A to a drive-equivalent value (e.g., pR>p0=0 MPa). From the time when the control request value pR has switched from the non-drive-equivalent value to the drive-equivalent value, the control target value determining section 32 corrects the control request value pR and outputs a control target value pT for the control pressure from the solenoid proportional pressure reducing valve 11A. In FIG. 4, the control request value pR starts to increase from the non-drive-equivalent value p0 at time t0, and the control target value determining section 32 starts to correct the control request value pR from this time. Time t0 is referred to as a drive start time, and a period of time that has elapsed from the drive start time is indicated by T (T=t−t0). According to the embodiment of the present invention, the following equation (1) is used as a formula for correcting the control request value pR:
[Math. 1]

$$p_T = (p_{max} - p_R)\exp(-K \cdot \tau) + p_R \qquad \text{equation (1)}$$

In the equation (1), pmax indicates the maximum output pressure in the usage range of the solenoid proportional pressure reducing valve 11A, K indicates a predetermined positive value, and the function exp(x) represents an exponential function with the Napier's constant used as the base of the exponent and x as the exponent.

The first term of the right side of the equation (1) includes the exponential function exp(−K·τ) where the exponent is represented by the product of the period of time τ that has elapsed from the drive start time and a constant value. When the control target value pT is calculated according to the equation (1) at time t0 (i.e., τ=0) as the drive start time, the output value of the exponential function is 1, and the control target value pT is calculated as pT=pmax. At time t0 as the drive start time, as illustrated in FIG. 4, consequently, the control target value pT is set to the maximum output pressure pmax in the usage range of the solenoid proportional pressure reducing valve 11A.

The exponential function exp(−K·τ) has the base exp(−K) and the exponent T. Since K represents a positive number, exp(−K) is of a value smaller than 1. Therefore, as the period of time τ that has elapsed from the drive start time increases, the exponential function exp(−K·τ) becomes gradually closer to zero. That is, inasmuch as the first and second terms of the right side of the equation (1) become gradually closer to zero as time elapses from the drive start time, the control target value pT becomes gradually closer to the control request value pR, as illustrated in FIG. 4.

The degree to which the control target value pT becomes gradually closer to the control request value pR can be adjusted by the predetermined value K. The predetermined value K may be adjusted with respect to some gradients at which the control request value pR is variable, in view of a waste time reducing effect that the controller 30 has on the control pressure to be described later. Moreover, the predetermined value K may be adjusted in advance with respect to some hydraulic working oil temperatures and stored as a function of temperatures in the controller 30, and the predetermined value K may be varied depending on measured values from hydraulic working oil temperature sensors (not shown) provided in the vicinity of the solenoid proportional pressure reducing valves 11A and 11B.

As described above, the control target value determining section 32 corrects the control target value pT, with respect to the control request value pR, into the maximum output pressure pmax in the usage range of the solenoid proportional pressure reducing valve 11A at the drive start time, and thereafter corrects the control target value pT so as to become gradually closer to the control request value pR with time.

A processing sequence carried out by the control target value determining section 32 will be described below with reference to FIG. 5. In step S1 illustrated in FIG. 5, the control target value determining section 32 acquires the control request value pR. Thereafter, in step S2, the control target value determining section 32 determines whether or not the control request value pR is equal to or smaller than the non-drive-equivalent value p0 for the solenoid proportional pressure reducing valve 11A. The subsequent processing is branched such that, if YES in step S2, then control goes to step S3, and if NO in step S2, then control goes to step S5.

If YES in step S2, i.e., if the control request value pR is a request value for not driving the solenoid proportional pressure reducing valve 11A, then the control target value pT is set to the non-drive-equivalent value p0 in step S3. In step S4, a duration time in which the control request value pR is equal to or smaller than the non-drive-equivalent value p0, i.e., a duration time TI of a drive stop request, is counted up. Finally, in step S5, the period of time τ that has elapsed from the drive start time is counted up, and the control target value determining section 32 outputs the control target value pT (=p0).

On the other hand, if NO in step S2, i.e., if the control request value pR is a request value for driving the solenoid proportional pressure reducing valve 11A, then it is determined in step S6 whether or not the duration time TI of the drive stop request is equal to or larger than a predetermined time TC. The predetermined time TC is of a predetermined value larger than 0, and is set, for example, as a period of time from the instant the drive voltage falls to zero until the control pressure drops from pmax to zero when the maximum drive current Imax has been supplied to the solenoid proportional pressure reducing valve 11A (i.e., when the control pressure pmax has been produced).

If YES in step S6, then T is set to zero in step S7. If NO in step S6, then control jumps to step S8, skipping the processing of step S7. In step S8, the control target value pT is calculated according to the equation (1). In step S9, the duration time TI of the drive stop request is set to zero. Finally, in step S5, the period of time τ that has elapsed from the drive start time is counted up, and the control target value determining section 32 outputs the control target value pT.

The above processing sequence is written as a program in the controller 30. The processing sequence, which includes the processing flow from the control request value computing section 31 to the current feedback controlling section 35 illustrated in FIG. 3, is executed in each constant control sample period set in the controller 30.

The controller according to the present embodiment has the above configuration. Next, operation of the controller 30 as applied to the control of currents to be supplied to the solenoid proportional pressure reducing valves 11A and 11B of the hydraulic system 100 incorporated in the hydraulic excavator will be described below. Since the solenoid proportional pressure reducing valves 11A and 11B are essentially identical in structure to each other and operate in the same fashion providing current values supplied thereto are the same, operation for controlling the solenoid proportional pressure reducing valve 11A will be described below by way of example.

First, operation at the times of supplying and stopping supplying a control current to the solenoid proportional pressure reducing valve 11A will be described below.

When the operation lever 10A illustrated in FIG. 1 is in a neutral position and no operation signal is outputted from the operation lever device 10 to the controller 30, supplying no current from the controller 30 to the solenoid actuator 20, the pilot spool 24 is biased toward the push rod 20C of the solenoid actuator 20 by the return spring 26. Therefore, the intermediate land 24C of the pilot spool 24 interrupts communication between the pump port 14 and the control pressure line 5A, and the control pressure line 5A (i.e., the hydraulic pilot section 4A of the directional control valve 4) is held in communication with the drain port 15.

Then, when the operator tilts the operation lever 10A and an operation signal is outputted from the operation lever device 10 to the controller 30, supplying a control current from the controller 30 via the connector 20B to the solenoid actuator 20, the solenoid in the actuator case 20A of the solenoid actuator 20 is energized, applying an electromagnetic force based on the current flowing through a solenoid coil not shown, to a movable core not shown in the solenoid. The electromagnetic force is transmitted from the movable core through the push rod 20C as a force tending to push the pilot spool 24 in the direction indicated by the arrow A. When the pushing force (electromagnetic force) exceeds the biasing force of the return spring 26, the pilot spool 24 is moved (slidingly displaced) toward the damping chamber 29.

The larger-diameter intermediate land 24C of the pilot spool 24 is advanced from the slide hole portion 23C to the position of the hydraulic fluid hole 22B, bringing the hydraulic fluid holes 22A and 22B (the pump port 14 and the control pressure line 5A) into communication with each other. At this time, the smaller-diameter intermediate land 24D is slidingly displaced (advanced) into the slide hole portion 23D in the sleeve 22, interrupting communication between the hydraulic fluid holes 22B and 22C (the control pressure line 5A and the drain port 15).

Consequently, the hydraulic working oil supplied from the primary pressure line 16 to the pump port 14 flows through the hydraulic fluid hole 22A into the space between the sleeve 22 and the pilot spool 24 and is introduced from the hydraulic fluid hole 22B through the control pressure line 5A into the hydraulic pilot section 4A of the directional control valve 4. The hydraulic working oil thus supplied from the solenoid proportional pressure reducing valve 11A through the control pressure line 5A to the hydraulic pilot section 4A of the directional control valve 4 increases a control pressure PA in the hydraulic pilot section 4A.

Inasmuch as the intermediate land 24C of the pilot spool 24 is larger in diameter than the intermediate land 24D, there is a pressure-bearing area difference between the intermediate lands 24C and 24D with respect to the control pressure in the sleeve 22. As a result, as described above, the pilot spool 24 bears a hydraulic pressure (pressing force) commensurate with the pressure-bearing area difference between the larger-diameter intermediate land 24C and the smaller-diameter intermediate land 24D as a load directed (in the direction indicated by the arrow B) against the push rod 20C.

While the sum of the load (hydraulic pressure) directed in the direction indicated by the arrow B due to the pressure-bearing area difference and the biasing force of the return spring 26 is smaller than the pressing force (electromagnetic force) applied in the direction indicated by the arrow A by the push rod 20C, the pilot spool 24 is further moved in the direction indicated by the arrow A toward the damping chamber 29. The amount of opening between the pump port 14 and the control pressure line 5A thus increases, supplying more hydraulic working oil from the pump port 14 to the control pressure line 5A to thereby increase the control pressure.

On the other hand, when the sum of the load directed in the direction indicated by the arrow B due to the pressure-bearing area difference and the biasing force of the return spring 26 becomes larger than the pressing force applied in the direction indicated by the arrow A by the push rod 20C, the pilot spool 24 is pushed back in the direction indicated by the arrow B toward the solenoid actuator 20. The larger-diameter intermediate land 24C of the pilot spool 24 thus slides into the slide hole portion 23C, interrupting communication between the pump port 14 and the control pressure line 5A. The smaller-diameter intermediate land 24D returns from the slide hole portion 23D to the position of the hydraulic fluid hole 22B in the sleeve 22, bringing the control pressure line 5A into communication with the drain port 15. Therefore, the hydraulic working oil in the hydraulic pilot section 4A of the directional control valve 4 is discharged through the control pressure line 5A into the drain port 15, resulting in a reduction in the control pressure.

In this manner, the pilot spool 24 is repeatedly moved back and forth axially (in the directions indicated by the arrows A and B) in the sleeve 22, causing the hydraulic working oil to repeatedly flow into and be discharged out of the hydraulic pilot section 4A of the directional control valve 4. As a consequence, the control pressure in the hydraulic pilot section 4A of the directional control valve 4 is adjusted in order to keep the pushing force (electromagnetic force) applied to the pilot spool 24 by the push rod 20C, the biasing force of the return spring 26, and the load (hydraulic pressure) directed in the direction indicated by the arrow B due to the pressure-bearing area difference in equilibrium. Stated otherwise, as the pushing force applied in the direction indicated by the arrow A by the push rod 20C is adjusted by the value of the current supplied to the solenoid actuator 20, the control pressure in the hydraulic pilot section 4A of the directional control valve 4 is variably controlled by the value of the current supplied to the solenoid actuator 20.

In the process of adjusting the control pressure in the hydraulic pilot section 4A of the directional control valve 4, the damping chamber 29 undergoes volume changes as the pilot spool 24 is moved (axially displaced). At this time, since the hydraulic working oil flows through the orifice 25 on account of the volume changes in the damping chamber 29, the orifice 25 performs a damping action to give resistance to the fluid flow, restraining sudden volume changes of the damping chamber 29. The orifice 25 and the damping chamber 29 are thus capable of restraining abrupt axial displacement of the pilot spool 24 and easing vibrations thereof, thereby stabilizing the control pressure.

When the operator returns the operation lever 10A (see FIG. 1) to the neutral position, stopping the control current from being supplied from the controller 30 to the solenoid actuator 20, the solenoid of the solenoid actuator 20 is de-energized, allowing the push rod 20C to return in the direction indicated by the arrow B to an initial state (standby position). Consequently, the pilot spool 24 is pushed back toward the solenoid actuator 20 under the biasing force of the return spring 26. The communication of the pump port 14 with the control pressure line 5A is interrupted, and the control pressure line 5A is brought into communication with the drain port 15. The hydraulic working oil in the hydraulic pilot section 4A of the directional control valve 4 is discharged through the control pressure line 5A into the drain port 15, causing the control pressure to drop to a tank pressure upon stoppage of the control current.

Next, operation of the controller 30 will be described below. In the controller 30, an operation signal from the operation lever device 10 is inputted to the control request value computing section 31. The control request value computing section 31 calculates and outputs a control request value pR on the basis of the operation signal and the design information, which is stored in advance in the to-be-worked surface design information storage area 34, of the surface to be worked.

The control request value pR outputted from the control request value computing section 31 is inputted to and corrected by the control target value determining section 32. The control target value determining section 32 then outputs a corrected result as a control target value pT. Details of its operation in the correcting process will be described later.

The control target value pT outputted from the control target value determining section 32 is converted by the control target value converting section 33 into a control target current value IT according to the relation between currents and control pressures of the solenoid proportional pressure reducing valve 11A, the relation having been stored in advance as a table of numerical values in the controller 30, and the control target current value IT is outputted from the control target value converting section 33.

Then, the current feedback controlling section 35 performs a feed control process using the control target current value IT as a target value, the actual current IA flowing through the solenoid actuator 20 as a controlled variable, and the duty ratio for the pulse width modulation on the drive voltage VC as an operated amount. The solenoid actuator 20 drives the pressure control valve 21 with an electromagnetic force Fact according to the actual current IA.

Figure 6:
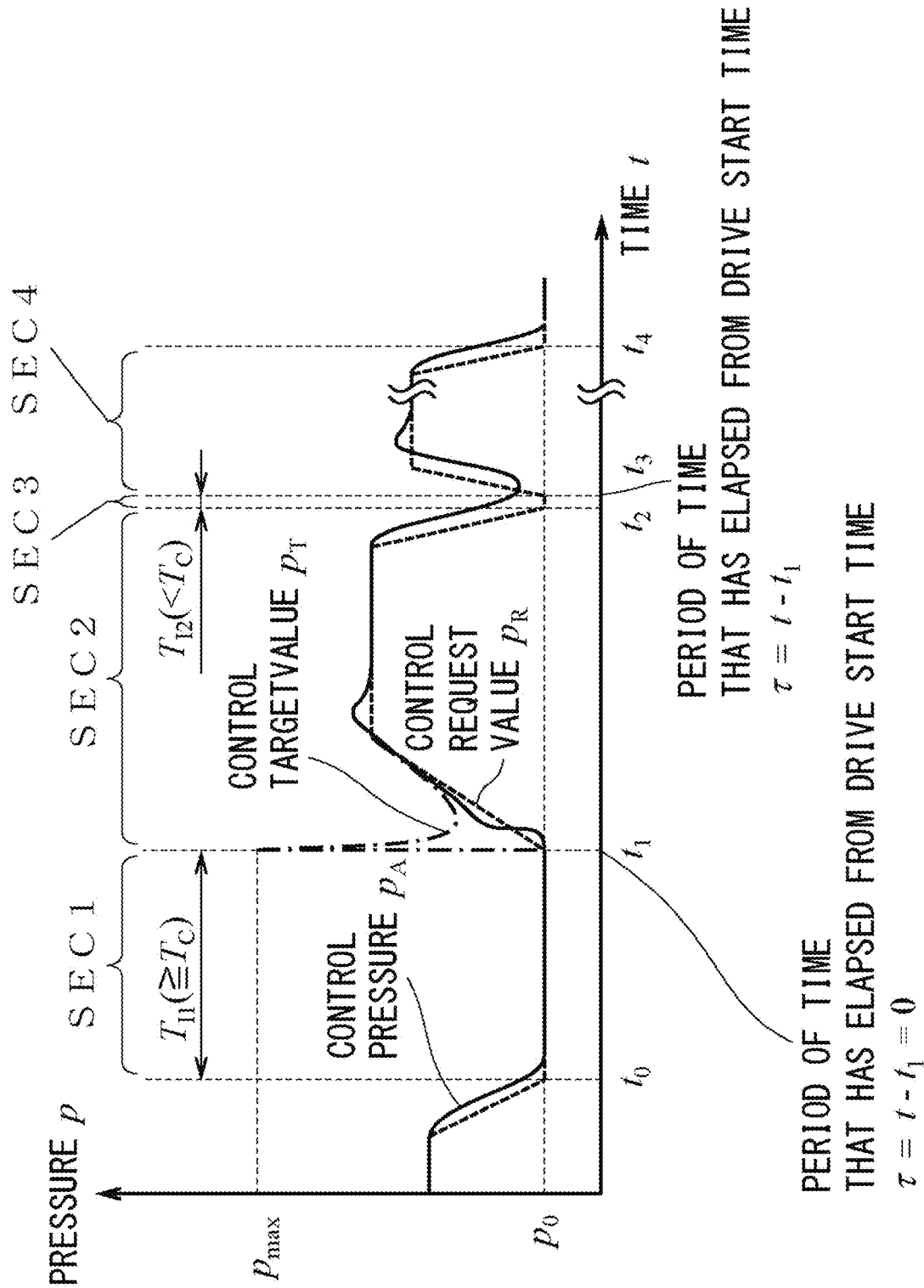
FIG. 6 is a diagram illustrating time history waveforms of control request values, control target values, and control pressures outputted from a solenoid proportional pressure reducing valve according to the first embodiment of the present invention.

A detailed processing sequence and operation of the control target value determining section 32 at the time the control request value pR (indicated by a broken line) illustrated in FIG. 6 is input by way of example until the control target value pT (indicated by a dot-and-dash line) is output and operation of the solenoid proportional pressure reducing valve 11A controlled by the controller 30, including the processing in the control target value determining section 32, will be described below.

In FIG. 6, paying attention to an interval SEC1 demarcated with times t0 and t1, the control request value pR is equal to the non-drive-equivalent value p0 (0 MPa). Therefore, the control target value determining section 32 selects YES in the determination of step S2 illustrated in FIG. 5. In the interval SEC1, steps S1, S2, S3, S4, and S5 illustrated in FIG. 5 are repeatedly carried out in succession in respective control sample periods. Therefore, in the interval SEC1, the control target value determining section 32 keeps outputting the non-drive-equivalent value p0 as the control target value pT. The control target value converting section 33 then keeps outputting the non-drive-equivalent current value I0 (e.g., I0=0 A) corresponding to the non-drive-equivalent value p0.

The actual current IA is controlled to maintain the non-drive-equivalent current value I0 by the current control process carried out by the current feedback controlling section 35. Since the non-drive-equivalent current value I0 is set to such a current value that the electromagnetic force Fact generated by the solenoid actuator 20 does not exceed the biasing force of the return spring 26, when the actual current IA keeps maintaining the non-drive-equivalent current value IC, the intermediate land 24C of the pilot spool 24 interrupts communication between the pump port 14 and the control pressure line 5A, and the control pressure line 5A (i.e., the hydraulic pilot section 4A of the directional control valve 4) is kept in communication with the drain port 15. Therefore, the control pressure pA of the solenoid proportional pressure reducing valve 11A is output as the non-drive-equivalent value p0 (0 MPa), as indicated by a solid line in FIG. 6.

Figure 5:
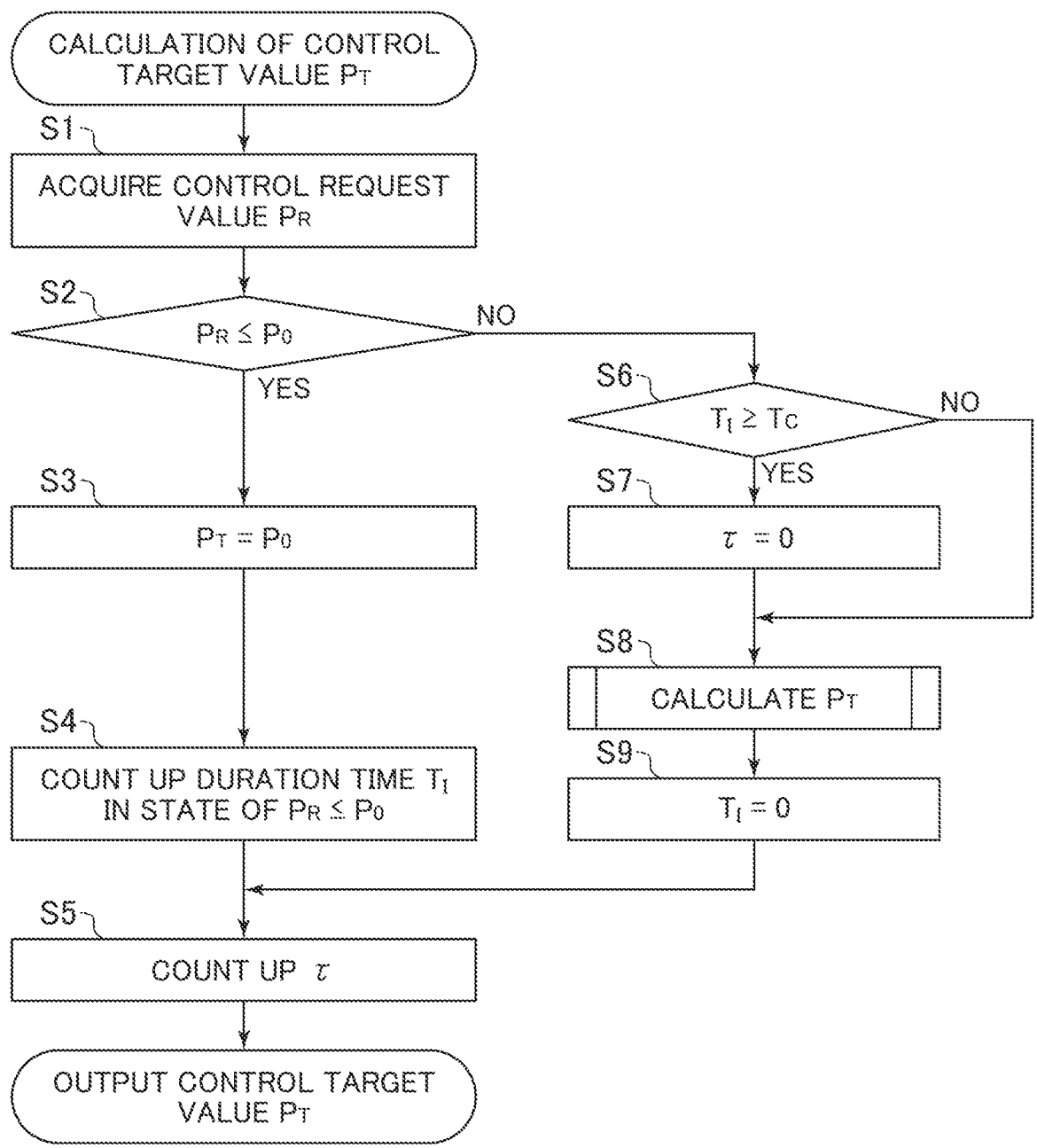
FIG. 5 is a flowchart of a processing sequence carried out by a control target value determining section according to the first embodiment of the present invention.

In the interval SEC1, the stop request duration time TI in which the control request value pR is equal to or smaller than the non-drive-equivalent value p0 is integrated as TI1 when the processing of step S4 illustrated in FIG. 5 is repeated. For subsequently illustrative purposes, it is assumed here that TI1 satisfies TI1≥TC with respect to the predetermined time TC.

Next, paying attention to an interval SEC2 demarcated with times t1 and t2 in FIG. 6, the control request value pR exceeds the non-drive-equivalent value p0 subsequently to time t1. Consequently, the control target value determining section 32 selects NO in the determination of step S2 illustrated in FIG. 5, and goes to the processing of step S6. In step S6, the control target value determining section 32 determines a magnitude relation between the duration time TI and the predetermined time TC.

At time t1, as TI=TI1 and TI1≥TC as described above, the control target value determining section 32 selects YES in step S6 illustrated in FIG. 5, and goes to the processing of step S7. In step S7, the period of time τ that has elapsed from the drive start time is set to zero. Therefore, time t1 becomes the drive start time. In step S8, the control target value pT is calculated according to the equation (1). At time t1, since the period of time τ that has elapsed from the drive start time is zero, pT=pmax is calculated according to the equation (1). In step S9, the stop request duration time TI is set to zero. Finally, in step S5, the period of time τ that has elapsed from the drive start time t1 is counted up for the control sample period.

The control sample period has elapsed, and at times later than time t1, the control target value determining section 32 selects NO again in step S2 and goes to the processing of step S6 again. Inasmuch as the stop request duration time TI has been set to zero in the processing of step S9 at time t1, at times later than time t1, the control target value determining section 32 selects NO in step S6 and goes to the processing of step S8 without performing the processing of step S7. Thereafter, steps S8, S9, and S5 are successively carried out as at time t1.

In other words, in the interval SEC2 illustrated in FIG. 6, steps S1, S2, S6, S7, S8, S9, and S5 illustrated in FIG. 5 are carried out in succession at time t1. At times later than time t1, steps S1, S2, S6, S8, S9, and S5 are repeated in succession in respective control sample periods.

Since pT=pmax is output at time t1 in the above operation, the control target value converting section 33 outputs the maximum drive current value Imax as the control target current value IT. Using the maximum drive current value Imax as a target value, the current feedback controlling section controls the actual current IA of the solenoid actuator 20. In other words, the solenoid actuator 20 is controlled to push the pilot spool 24 of the pressure control valve 21 with a maximum electromagnetic force that can be output in the usage range at the drive start time t1.

At times later than time t1, the value of the period of time τ that has elapsed from the drive start time t1 increases, and the control target value pT becomes gradually closer to the control request value pR on the basis of the calculation represented by the equation (1). After time t1, therefore, the control target current value IT becomes gradually closer to a current value corresponding to the control request value pR from the maximum drive current value Imax.

With the controller according to the present embodiment, since the pilot spool 24 is displaced toward the damping chamber 29 with a maximum drive acceleration in the usage range when it starts to be driven by the solenoid actuator 20, the larger-diameter intermediate land 24C is advanced from the slide hole portion 23C to the position of the hydraulic fluid hole 22B, bringing the hydraulic fluid holes 22A and 22B (the pump port 14 and the control pressure line 5A) into communication with each other, and the smaller-diameter intermediate land 24D is slidingly displaced (advanced) into the slide hole portion 23D in the sleeve 22, interrupting communication between the hydraulic fluid holes 22B and 22C (the control pressure line 5A and the drain port 15) in a reduced period of time, with the result that waste time at the time the control pressure builds up is reduced.

With the hydraulic system 100 according to the present embodiment, moreover, as the control target current value IT becomes gradually closer to the current value corresponding to the control request value pR, the pilot spool 24 is prevented from being excessively displaced (an excessive opening is prevented from developing between the pump port 14 and the control pressure line 5A). After the control pressure has started to be produced, the control pressure pA can follow the control request value pR without largely exceeding the control request value pR.

Next, paying attention to an interval SEC3 demarcated with times t2 and t3 in FIG. 6, the control request value pR is equal to the non-drive-equivalent value p0. Therefore, the control target value determining section 32 keeps outputting the non-drive-equivalent value p0 as the control target value pT by operating in the same manner as with the interval SEC1. The stop request duration time TI in which the control request value pR is equal to or smaller than the non-drive-equivalent value p0 is integrated as TI2. For subsequently illustrative purposes, it is assumed here that a next interval SEC4 begins before the control pressure pA in the interval SEC2 drops to the non-drive-equivalent value p0 in the interval SEC3, and TI2 satisfies TI2≥TC with respect to the predetermined time TC.

Paying attention to the interval SEC4 that is demarcated with times t3 and t4 in FIG. 6, the control request value pR exceeds the non-drive-equivalent value p0 again subsequently to time t3. Therefore, as with the interval SEC2, the control target value determining section 32 selects NO in the determination of step S2 illustrated in FIG. 5 and goes to the processing of step S6. In step S6, the control target value determining section 32 determines the magnitude relation between the duration time TI and the predetermined time TC.

At time t3, however, since TI=TI2 and TI2<TC as described above, unlike the case in the interval SEC2, the control target value determining section 32 selects NO in step S6 and goes to the processing of step S8 without performing the processing of step S7, after which steps S8, S9, and S5 are successively carried out. In other words, time t3 is not reset to the drive start time, and the processing goes on with the drive start time remaining to be the previously set time t1. The period of time τ that has elapsed from the drive start time is counted up from time t1 as a starting time. Consequently, at time t3, because the exponential function exp(−K·τ) remains gradually closer to zero in the calculation of the control target value pT according to the equation (1) in step S8, the control target value pT does not become pT=pmax at time t3 as illustrated in FIG. 6 and is output as a value gradually closer to the control request value pR. The control sample period elapses, and since TI=0<TC is satisfied at times later than time t3, the same processing is carried out as at time t3, and the control target value pT is output as the value gradually closer to the control request value pR.

That is, from the drop of the control request value pR in the interval SEC2 to the drive start time in the interval SEC4, if the stop request duration time TI2 in the interval SEC3 is less than the predetermined time TC, then the control request value pR is not corrected by the control target value determining section 32 and is set as the control target value pT.

The solenoid proportional pressure reducing valve 11A performs pressure control by moving the pilot spool 24 back and forth in order for the larger-diameter intermediate land 24C and the smaller-diameter intermediate land 24D of the pilot spool 24 to establish and interrupt communication between the pump port 14 and the control pressure line 5A and between the control pressure line 5A and the drain port 15. In other words, while the solenoid proportional pressure reducing valve 11A is performing pressure control, the pilot spool 24 is repeatedly moved back and forth in the vicinity of positions where communication is established and interrupted. The pilot spool 24 is displaced with a time lag from the outputting of the control request value pR from the controller 30 due to motion characteristics of the pilot spool 24.

Therefore, even when the control request value pR has fully dropped to the non-drive-equivalent value p0, the pilot spool 24 may remain in the positions where communication is established and interrupted, due to the time lag of the motion of the pilot spool 24, and the solenoid proportional pressure reducing valve 11A may continue to operate for pressure control.

For increasing the control request value pR again from this state, if the control target value pT is set to pmax as at the drive start in the interval SEC1, then since the pilot spool 24 is subjected to the maximum electromagnetic force of the solenoid actuator 20 in the vicinity of the positions where communication is established and interrupted, the pilot spool 24 is excessively displaced toward the damping chamber 29, providing an excessive opening between the pump port 14 and the control pressure line 5A. As a result, the control pressure pA greatly exceeds the control request value pR.

With the controller according to the present embodiment, by contrast, if the control request value pR becomes the drive-equivalent value within a period of time in which the control pressure pA does not fall sufficiently, i.e., within a period of time in which the pilot spool 24 does not return from near the positions where communication is established and interrupted to the non-drive state illustrated in FIG. 2, as in the case of the operation at time t3 in the interval SEC4, then the control target value determining section 32 does not set the control target value pT to pmax and outputs the control request value pR as it is. Consequently, the control pressure pA of the solenoid proportional pressure reducing valve 11A can be prevented from deviating largely from the control request value pR.

Conclusions

According to the present embodiment, in the hydraulic system 100 including the hydraulic pump 1, the hydraulic actuator 3 that is driven by the hydraulic fluid delivered from the hydraulic pump 1, the control valve 4 that performs control to cause the hydraulic fluid delivered from the hydraulic pump 1 to be supplied to and discharged from the hydraulic actuator 3, the solenoid valve 11A (11B) that generates the control pressure pA (pB) for operating the control valve 4, the operation device 10 that is operated to input the control request value pR as a request value for the control pressure pA (pB), and the controller 30 configured to set the control target value pT as a target value for the control pressure pA (pB) depending on the control request value pR and drive the solenoid valve 11A (11B) with the control target value pT, the controller 30 is configured to set the control target value pT such that the control target value pT becomes the maximum output pressure pmax in the usage range of the solenoid valve 11A (11B) at the time of starting to drive the solenoid valve 11A (11B) and becomes gradually closer to the control request value pR as time elapses after having reached the maximum output pressure pmax.

According to the present embodiment thus arranged, the control target value pT at the time of starting to drive the solenoid valve 11A (11B) is set to the maximum output pressure pmax in the usage range of the solenoid valve 11A (11B) irrespectively of the control request value pR. Since the spool of the solenoid valve 11A (11B) is thus displaced at a high speed to the valve open position immediately after the solenoid valve 11A (11B) has started to be driven, the time lag from the time of starting to drive the solenoid valve 11A (11B) until the control pressure pA (pB) starts to rise can be shortened. Further, after the control pressure pA (pB) has started to rise, inasmuch as the control target value pT becomes gradually closer to the control request value pR as time elapses from the time of starting to drive the solenoid valve 11A (11B), the control pressure pA (pB) is prevented from largely exceeding the control request value pR. In this manner, at the time of starting to drive the solenoid valve 11A (11B), it is possible to cause the control pressure pA (pB) outputted from the solenoid valve 11A (11B) to follow the control request value pR quickly. Although the exponential function is used to make the control target value pT gradually closer to the control request value pR according to the present embodiment, other functions (e.g., a hyperbolic function) may be used.

Moreover, the controller 30 is configured to compute the control target value pT such that the difference between the control target value pT and the control request value pR decreases in an exponential series fashion as the elapsed period of time $\tau$ increases. This allows the equation for obtaining the control target value pT incorporated in the controller 30 to be defined by a simple exponential function. Moreover, the degree to which the control target value pT becomes gradually closer to the control request value pR can be adjusted only by changing the value of the base of the exponential function.

Further, the controller 30 is configured to, if the period of time from the time of stopping driving the solenoid valve 11A (11B) until the time of starting to drive the solenoid valve 11A (11B) in a next cycle is less than the predetermined time TC, measure the elapsed period of time $\tau$ from a starting point represented by the time of starting to drive the solenoid valve 11A (11B) in a preceding cycle, but if the period of time from the time of stopping driving the solenoid valve 11A (11B) until the time of starting to drive the solenoid valve 11A (11B) in the next cycle is equal to or more than the predetermined time TC, measure the elapsed period of time $\tau$ from a starting point represented by the time of starting to drive the solenoid valve 11A (11B) in the next cycle. Therefore, if the control request value pR becomes the drive-equivalent value within a period of time in which the control pressure pA (pB) does not fall sufficiently, i.e., within a period of time in which the pilot spool 24 does not return from near the positions where communication is established and interrupted to the non-drive state illustrated in FIG. 2, then the control target value determining section 32 does not set the control target value pT to pmax and outputs the control request value pR as it is. Consequently, the control pressure pA (pB) of the solenoid valve 11A (11B) can be prevented from deviating largely from the control request value pR.

The solenoid valve 11A (11B) has the solenoid actuator 20 that is controlled by the voltage outputted from the controller 30 and the pressure control valve 21 that is driven by the solenoid actuator 20. The controller 30 is configured to compute the current target value IT as a target value for the current IA (IB) to flow through the solenoid actuator 20 on the basis of the control target value pT, and cause the current IA (IB) flowing through the solenoid actuator 20 to follow the current target value IT according to a feedback control process using at least one of proportional compensation, derivative compensation, and integral compensation. This makes it possible to increase the accuracy with which to drive the solenoid actuator 20.

Second Embodiment

Figure 7:
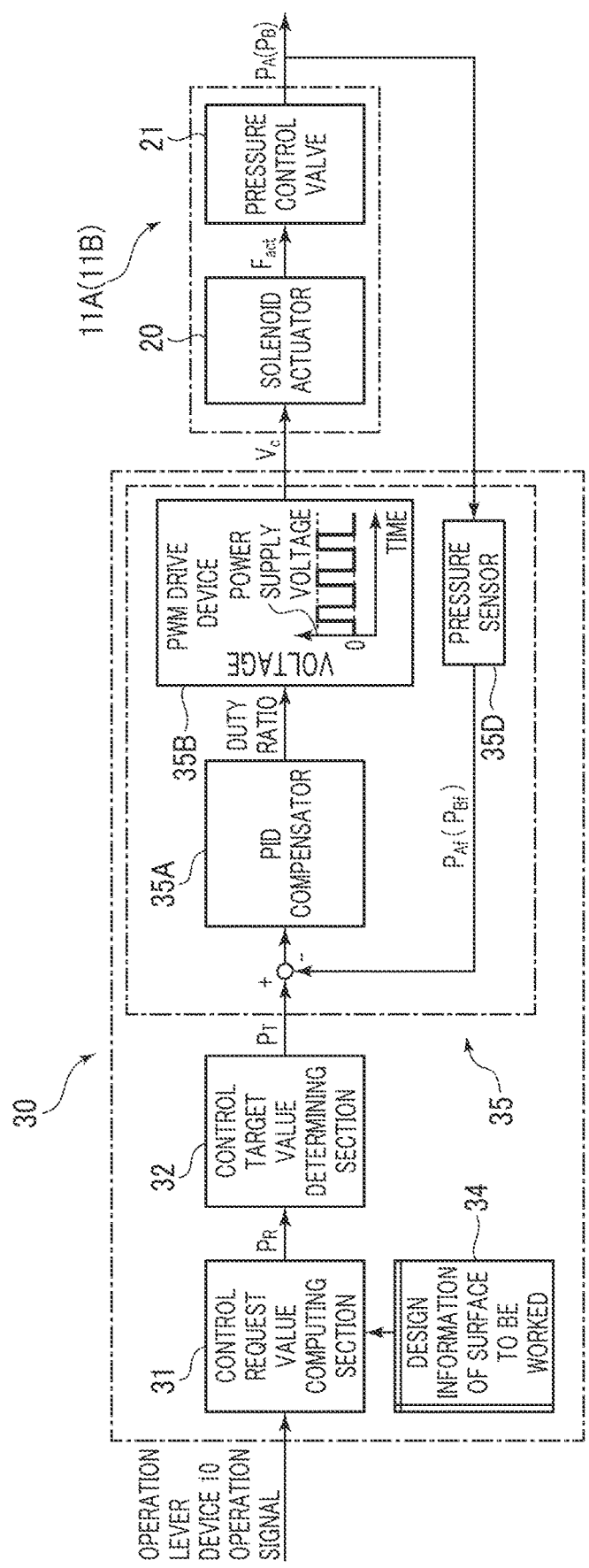
FIG. 7 is a diagram illustrating time history waveforms of control request values and control target values according to a second embodiment of the present invention.
Figure 8:
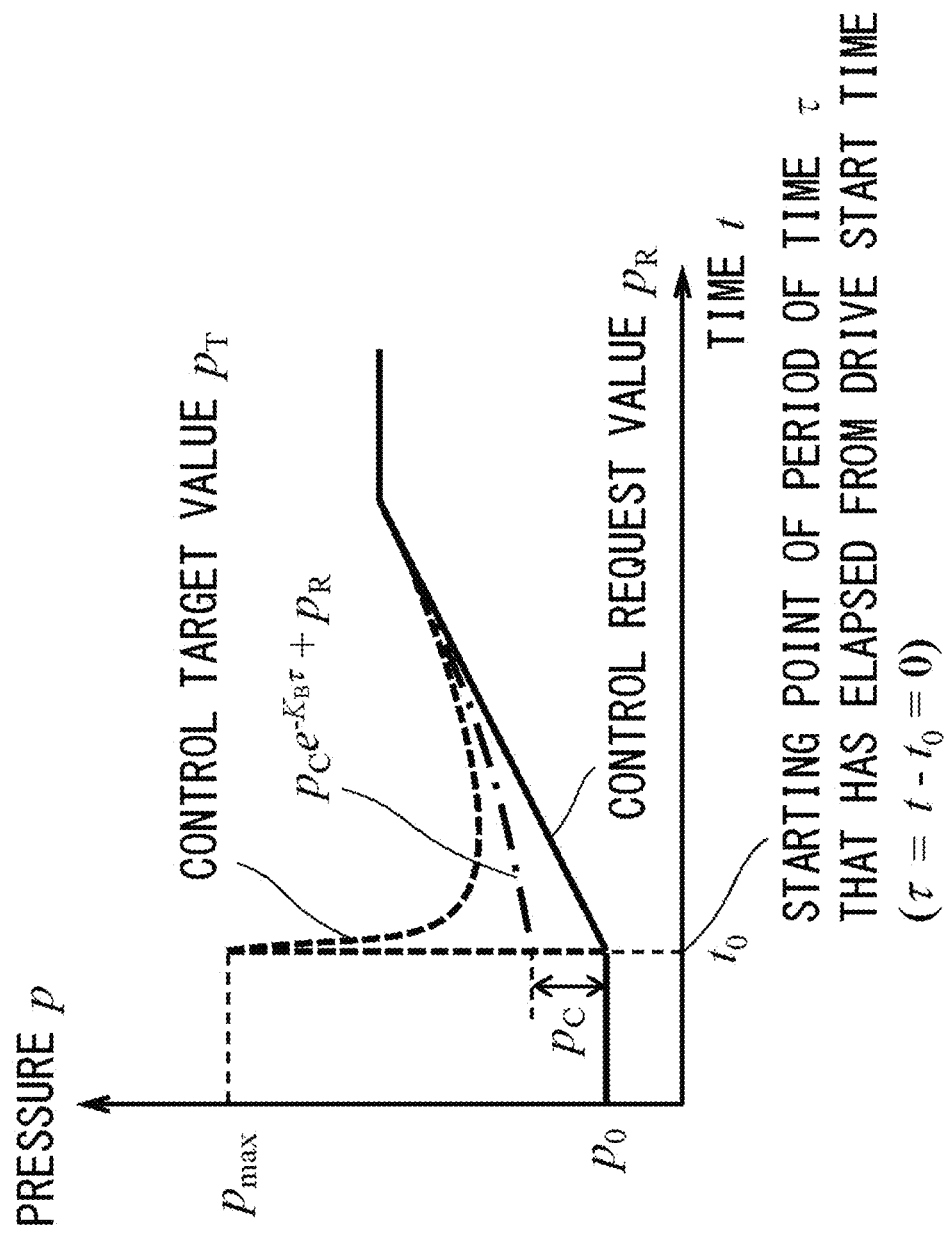
FIG. 8 is a diagram illustrating time history waveforms of control request values and control target values according to a third embodiment of the present invention.

Description of 100 according to a second embodiment of the present invention will be made below with reference to FIG. 7. FIG. 7 is a functional block diagram of the hydraulic system 100 according to the present embodiment. The differences from the first embodiment (see FIG. 3) will mainly be described below.

As illustrated in FIG. 7, a controller 30 dispenses with the control target value converting section 33 (see FIG. 3) and includes a sensor 35D for sending the control pressure pA (pB) outputted from the pressure control valve 21, instead of the current sensor 35C (see FIG. 3) that senses the current IA (IB) flowing through the solenoid actuator 20. Whereas the controller 30 (see FIG. 3) according to the first embodiment performs a feedback control process on the current IA (IB) flowing through the solenoid actuator 20 with use of at least one of proportional compensation, derivative compensation, and integral compensation, the controller (see FIG. 7) according to the present embodiment performs a feedback control process on the control pressure pA (pB) outputted from the solenoid valve 11A (11B).

Conclusions

The controller 30 incorporated in the hydraulic system 100 according to the present embodiment is configured to cause the control pressure pA (pB) outputted from the solenoid valve 11A (11B) to follow the control target value pT according to a feedback control process using at least one of proportional compensation, derivative compensation, and integral compensation.

According to the present embodiment thus arranged, since a feedback control process is performed on the control pressure pA (pB) outputted from the solenoid valve 11A (11B), it is possible to increase the accuracy with which to control the control pressure pA (pB).

Third Embodiment

A third embodiment of the present invention will be described below mainly with respect to the differences from the first embodiment. The present embodiment is different from the first embodiment only as to the contents of calculation of the control target value pT in step S8 illustrated in FIG. 5.

According to the present embodiment, the control target value pT is calculated according to the following equation (2) in step S8 illustrated in FIG. 5:

[Math. 2]

$$p_T = (p_{max} - p_C - p_R)\exp(-K_A \tau) + p_C \exp(-K_R \tau) + p_R \qquad \text{equation (2)}$$

In the equation (2), pc indicates a predetermined value in the range from the maximum output pressure pmax exclusive to zero inclusive, and KA and KB each indicate a predetermined positive value, KA representing a rate at which the first term of the right side of the equation (2) becomes gradually closer to zero and KB representing a rate at which the second term of the right side of the equation (2) becomes gradually closer to zero, KA being set to a value larger than KB. In other words, the second term of the right side of the equation (2) becomes more gradually closer to zero than the first term of the right side of the equation (2).

FIG. 7 illustrates time history waveforms of the control request value pR (indicated by a solid line) and the control target value pT (indicated by a broken line) calculated according to the equation (2). The first and second terms of the right side of the equation (2) include the respective exponential functions $(\exp(-KA\cdot\tau)$ and $\exp(-KB\cdot\tau))$ where each of the exponents is represented by the product of the period of time $\tau$ that has elapsed from the drive start time and a constant value. When the control target value pT is calculated according to the equation (2) at time t0 (i.e., $\tau=0$) as the drive start time, the output value of the exponential function is 1, and the control target value pT is calculated as pT=pmax. At time t0 as the drive start time, as illustrated in FIG. 7, consequently, the control target value pT is set to the maximum output pressure pmax in the usage range of the solenoid proportional pressure reducing valve 11A.

The first and second terms of the right side of the equation (2) include the exponential functions $(\exp(-KA\cdot\tau)$ and $\exp(-KB\cdot\tau))$ whose bases are indicated respectively by $\exp(-KA)$ and $\exp(-KB)$ and exponents by T. Since KA and KB are positive numbers, the bases $\exp(-KA)$ and $\exp(-KB)$ are of values smaller than 1. Therefore, as the period of time T that has elapsed from the drive start time increases, the exponential functions $\exp(-KA\cdot\tau)$ and $\exp(-KB\cdot\tau)$ become gradually closer to zero. That is, inasmuch as the first and second terms of the right side of the equation (2) become gradually closer to zero as time elapses from the drive start time, the control target value pT (indicated by the broken line) becomes gradually closer to the control request value pR (indicated by the solid line), as illustrated in FIG. 7.

As described above, the control target value pT becomes gradually closer to the control request value pR. According to a different way of looking at the equation (2), as the first term of the right side becomes gradually closer to zero, the control target value pT becomes gradually closer to the sum of the second term of the right side and the control request value pR (indicated by a dot-and-dash line), as illustrated in FIG. 7. As the second term of the right side simultaneously becomes gradually closer to zero, the control target value pT becomes gradually closer to the control request value pR. Therefore, by using the calculation according to the equation (2), while the control target value pT becomes gradually closer to the control request value pR, the control target value pT may be set to a larger value than according to the equation (1), during the process of causing the control target value pT to become gradually closer to the control request value pR.

According to the present embodiment, consequently, when the solenoid proportional pressure reducing valves 11A and 11B are continuously used with the large viscous resistance posed on the pilot spool 24 by the hydraulic working oil in a low-temperature environment, for example, or when the pilot spool 24 moves slowly due to a reduced restrictor diameter of the orifice 25 for more emphasis on stable pressure control by the solenoid proportional pressure reducing valves 11A and 11B, a better waste time reducing effect than in the case of the first embodiment can be achieved.

By setting the predetermined value pc to zero, the equation (2) offers the same contents of calculation as the equation (1) and can be handled in the same manner as with the first embodiment.

Conclusions

The controller 30 incorporated in the hydraulic system 100 according to the present embodiment sets as the control target value pT a value obtained by adding up a first value (the first term of the right side of the equation (2)), a second value (the second term of the right side of the equation (2)), and the control request value pR, the first value being obtained in such a manner that the value obtained by subtracting the control request value pR and the predetermined value pc smaller than the maximum output pressure pmax from the maximum output pressure pmax becomes gradually closer to zero as the elapsed period of time $\tau$ increases, and the second value being obtained in such a manner that the predetermined value pc becomes more gradually closer to zero than the first value as the elapsed period of time $\tau$ increases.

According to the present embodiment thus arranged, the sum of the first value (the first term of the right side of the equation (2)) and the second value (the second term of the right side of the equation (2)) at the time of starting to drive the solenoid valve 11A (11B) is equal to the value obtained by subtracting the control request value pR at the drive start time from the maximum output pressure pmax, and the control target value pT for the solenoid valve 11A (11B) is equal to the sum of the first value, the second value, and the control request value pR at the drive start time. Consequently, as is the case with the first embodiment, the control target value pT at the time of starting to drive the solenoid valve 11A (11B) is uniformly set to the maximum output pressure pmax of the solenoid valve 11A (11B) irrespectively of the control request value pR.

Moreover, inasmuch as both the first value and the second value become gradually closer to zero as the period of time $\tau$ that has elapsed from the drive start time of the solenoid valve 11A (11B) increases, the control target value pT for the solenoid valve 11A (11B) becomes gradually closer to the control request value pR as the elapsed period of time $\tau$ increases, as with the first embodiment. Because the rate at which the second value becomes gradually closer to zero is lower than the rate at which the first value becomes gradually closer to zero, the rate at which the control target value pT becomes gradually closer to the control request value pR is adjusted by appropriately setting the predetermined value pc depending on response characteristics of the solenoid valve 11A (11B). Accordingly, when the solenoid valve 11A (11B) is continuously used with the large viscous resistance posed on the spool by the hydraulic fluid in a low-temperature environment, for example, or when the spool of the solenoid valve 11A (11B) is displaced slowly due to motion characteristics of the spool, a better waste time reducing effect than in the case of the first embodiment can be achieved by increasing the predetermined value pc to reduce the rate at which the control target value pT becomes gradually closer to the control request value pR.

Although the embodiments of the present invention have been described in detail above, the present invention is not limited to the above-described embodiments and may cover various modifications. For example, the above embodiments have been described in detail for an easier understanding of the present invention, and may not necessarily be limited to configurations including all the details described above. Moreover, it is possible to add some of the details of certain embodiments to the details of other embodiments, and to delete some of the details of certain embodiments or replace some of the details of certain embodiments with some of the details of other embodiments.

DESCRIPTION OF REFERENCE CHARACTERS

1: Hydraulic pump
1A: Delivery line
2: Tank
3: Hydraulic cylinder (hydraulic actuator)
3A: Tube
3B: Piston
3C: Rod
3D, 3E: Hydraulic chamber
4: Directional control valve
4A, 4B: Hydraulic pilot section
5A, 5B: Control pressure line
6A, 6B: Main line
7: Pilot pump
8: Low-pressure relief valve
9: High-pressure relief valve
10: Operation lever device (operation device)
11A, 11B: Solenoid proportional pressure reducing valve (solenoid valve)
12: Housing
13: Solenoid valve cartridge insertion hole
14: Pump port
15: Drain port
16: Primary pressure line
17: Drain line
20: Solenoid actuator
21: Pressure control valve
22: Sleeve
22A, 22B, 22C: Hydraulic fluid hole
23: Stepped hole
23A: Spring housing hole portion
23B, 23C, 23D, 23E: Slide hole portion
24: Pilot spool
24A: Boss
24B: Land
24C, 24D: Intermediate land
24E: Land
24F: Axial hole
24G, 24H: Hydraulic line
25: Orifice
27: Partition plate
28: Member
29: Damping chamber
30: Controller
31: Control request value computing section
32: Control target value determining section
33: Control target value converting section
34: To-be-worked surface design information storage area
35: Current feedback controlling section
35A: PID compensator
35B: PWM drive device
35C: Current sensor
43: Drain line
100: Hydraulic system

The invention claimed is:
1. A hydraulic system comprising:
a hydraulic pump;
a hydraulic actuator that is driven by a hydraulic fluid delivered from the hydraulic pump;
a control valve that performs control to cause the hydraulic fluid delivered from the hydraulic pump to be supplied to and discharged from the hydraulic actuator;
a solenoid valve that generates a control pressure for operating the control valve;
an operation device that is operated to input a control request value as a request value for the control pressure; and
a controller configured to set a control target value as a target value for the control pressure depending on the control request value and drive the solenoid valve with the control target value,
wherein the controller is configured to set the control target value such that the control target value becomes a maximum output pressure in a usage range of the solenoid valve at a time of starting to drive the solenoid valve and becomes gradually closer to the control request value as time elapses after having reached the maximum output pressure,
wherein the controller is configured to set as the control target value a value obtained by adding up a first value, a second value, and the control request value, the first value being obtained in such a manner that a value obtained by subtracting the control request value and a predetermined value smaller than the maximum output pressure from the maximum output pressure becomes gradually closer to zero as an elapsed period of time increases, and the second value being obtained in such a manner that the predetermined value becomes more gradually closer to zero than the first value as the elapsed period of time increases.

2. The hydraulic system according to claim 1,
wherein the controller is configured to
measure the elapsed period of time from a starting point represented by a time of starting to drive the solenoid valve in a preceding cycle when a period of time from a time of stopping driving the solenoid valve until a time of starting to drive the solenoid valve in a next cycle is less than a predetermined time, and
measure the elapsed period of time from a starting point represented by the time of starting to drive the solenoid valve in the next cycle when the period of time from the time of stopping driving the solenoid valve until the time of starting to drive the solenoid valve in the next cycle is equal to or more than the predetermined time.

3. A hydraulic system comprising:
a hydraulic pump;
a hydraulic actuator that is driven by a hydraulic fluid delivered from the hydraulic pump;
a control valve that performs control to cause the hydraulic fluid delivered from the hydraulic pump to be supplied to and discharged from the hydraulic actuator;
a solenoid valve that generates a control pressure for operating the control valve;
an operation device that is operated to input a control request value as a request value for the control pressure; and
a controller configured to set a control target value as a target value for the control pressure depending on the control request value and drive the solenoid valve with the control target value,
wherein the controller is configured to set the control target value such that the control target value becomes a maximum output pressure in a usage range of the solenoid valve at a time of starting to drive the solenoid valve and becomes gradually closer to the control request value as time elapses after having reached the maximum output pressure, wherein the solenoid valve has a solenoid actuator that is controlled by a voltage outputted from the controller and a pressure control valve that is driven by the solenoid actuator, and the controller is configured to compute a current target value as a target value for a current to flow through the solenoid actuator on a basis of the control target value, and cause the current flowing through the solenoid actuator to follow the current target value according to a feedback control process using at least one of proportional compensation, derivative compensation, and integral compensation.

4. A hydraulic system comprising:

a hydraulic pump;

a hydraulic actuator that is driven by a hydraulic fluid delivered from the hydraulic pump;

a control valve that performs control to cause the hydraulic fluid delivered from the hydraulic pump to be supplied to and discharged from the hydraulic actuator;

a solenoid valve that generates a control pressure for operating the control valve;

an operation device that is operated to input a control request value as a request value for the control pressure; and a controller configured to set a control target value as a target value for the control pressure depending on the control request value and drive the solenoid valve with the control target value, wherein the controller is configured to set the control target value such that the control target value becomes a maximum output pressure in a usage range of the solenoid valve at a time of starting to drive the solenoid valve and becomes gradually closer to the control request value as time elapses after having reached the maximum output pressure, wherein the controller is configured to cause the control pressure outputted from the solenoid valve to follow the control target value according to a feedback control process using at least one of proportional compensation, derivative compensation, and integral compensation.

* * * * *